(12) United States Patent
Ollila

(10) Patent No.: US 11,509,835 B2
(45) Date of Patent: *Nov. 22, 2022

(54) IMAGING SYSTEM AND METHOD FOR PRODUCING IMAGES USING MEANS FOR ADJUSTING OPTICAL FOCUS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,995

(22) Filed: Apr. 26, 2021

(65) Prior Publication Data
US 2021/0243384 A1    Aug. 5, 2021

Related U.S. Application Data

(63) Continuation-in-part of application No. 16/505,645, filed on Jul. 8, 2019, now Pat. No. 11,017,562.

(51) Int. Cl.
| | |
|---|---|
| *H04N 5/262* | (2006.01) |
| *H04N 5/232* | (2006.01) |
| *G02B 27/00* | (2006.01) |
| *G02B 7/09* | (2021.01) |
| *G03B 13/36* | (2021.01) |
| *G03B 30/00* | (2021.01) |

(52) U.S. Cl.
CPC ............ *H04N 5/2621* (2013.01); *G02B 7/09* (2013.01); *G02B 27/0093* (2013.01); *G03B 13/36* (2013.01); *G03B 30/00* (2021.01); *H04N 5/23212* (2013.01); *H04N 5/23219* (2013.01)

(58) Field of Classification Search
CPC ............. H04N 5/2621; H04N 5/23212; H04N 5/23219; H04N 5/2254; G02B 7/09; G02B 27/0093; G02B 2027/011; G02B 2027/0187; G02B 27/017; G03B 13/36; G03B 30/00; G06V 20/20; G06V 40/18; G06V 40/19; G02F 1/29; G06F 3/011; G06F 3/013

See application file for complete search history.

(56) References Cited

U.S. PATENT DOCUMENTS

| | | | | |
|---|---|---|---|---|
| 10,937,129 | B1* | 3/2021 | Fix | G09G 5/00 |
| 2014/0146223 | A1* | 5/2014 | Eromaki | G02B 7/08 |
| | | | | 348/357 |
| 2014/0153102 | A1* | 6/2014 | Chang | G02B 27/0172 |
| | | | | 359/630 |
| 2019/0179409 | A1* | 6/2019 | Jones | G06F 1/163 |
| 2021/0223547 | A1* | 7/2021 | Yang | G02B 27/017 |

\* cited by examiner

*Primary Examiner* — Padma Haliyur
(74) *Attorney, Agent, or Firm* — Ziegler IP Law Group, LLC

(57) ABSTRACT

An imaging system for producing images for display apparatus. Imaging system includes at least one imaging unit arranged to face real-world scene including camera, optical element including first optical portion and second optical portion having different focal lengths, first focal length of first optical portion is smaller than second focal length of second optical portion, and means for adjusting optical focus; and processor. Processor is configured to obtain gaze direction of user; determine region of interest within real-world scene; and control means for adjusting optical focus of imaging unit, based on focal lengths of first and second optical portions, to capture warped image of real-world scene, the warped image having spatially-uniform angular resolution.

16 Claims, 7 Drawing Sheets

IMAGING SYSTEM AND METHOD FOR PRODUCING IMAGES USING MEANS FOR ADJUSTING OPTICAL FOCUS

CROSS-REFERENCE TO RELATED APPLICATIONS

This application is a continuation-in-part of U.S. patent application Ser. No. 16/505,645, titled "IMAGING SYSTEM AND METHOD FOR PRODUCING IMAGES USING MEANS FOR ADJUSTING OPTICAL FOCUS" and filed on Jul. 8, 2019, which is incorporated herein by reference.

TECHNICAL FIELD

The present disclosure relates generally to imaging systems; and more specifically, to imaging systems for producing images for display apparatuses. Moreover, the present disclosure relates to methods for producing images for display apparatuses via aforesaid imaging systems.

BACKGROUND

Presently, several extended reality (XR) technologies are being used to present interactive XR environments to users. The users utilize specialized Head-Mounted Devices (HMDs) for experiencing and interacting with such XR environments. Conventional HMDs display images that collectively constitute such XR environments, to the user. When such images are captured according to a gaze direction of the user, the XR environments would appear realistic to the user.

In mixed-reality and extended-reality devices, one or more imaging systems—typically video cameras, called video-see-through (VST) cameras, are used to capture an image stream of the real world environment. These cameras are mounted in the HMD itself, mimicking the eyes of the user. The image stream is processed and fed into the display system of the HMD. The field of view (FoV) of human visual system is wide, up to 180 degrees horizontal and 150 degrees vertical: designing a conventional imaging system that offers such a high FoV, yet having an angular resolution similar to the human eye, requires components not present on the market, such as >200 megapixel sensors. Therefore, it has been proposed to utilize some specific human visual properties, namely gaze-contingency/foveation, wherein the resolution, or amount of detail, varies across the image, for example, being the highest in the image corresponding to the center of the eye's retina, the fovea.

In order to capture such gaze-contingent images with mixed-reality and extended-reality devices utilizing video-see-through (VST) cameras, various types of imaging equipment and techniques are currently being employed. In document U.S. 20170161951, there is described a method for correcting for distortion from optical errors of an optics block in a headset, wherein the optics block is a part of a virtual reality headset. This method concerns technical problems of inability in accommodating for vergence and accommodation conflicts, and presence of field curvature errors in images. Generally, imaging equipment and techniques employ optical components (such as lenses, mirrors, and the like) having uniform optical properties. Nowadays, specialized optical components purposely having variable optical properties with respect to magnification and/or de-magnification are being developed for use in such imaging equipment and techniques. Notably, these specialized optical components are used to deliberately capture warped images of the given environment by magnifying a first portion of the given environment to a greater degree than a second portion of the given environment. As a result, these warped images have a wide field of view that emulates the FoV of the human visual system. Often, such imaging equipment and techniques employ autofocusing mechanism to adjust optical focus of said imaging equipment based on the gaze direction of the user.

However, such imaging equipment and techniques employing specialized optical components and autofocusing mechanism have certain limitations associated therewith. The autofocusing mechanism of such imaging equipment and techniques have a low autofocus speed. As a result, a large amount of time is required for autofocusing. Therefore, generation of the warped images using such imaging equipment and techniques is very time consuming. In such a case, when the autofocus speed of the autofocusing mechanism is increased using conventional techniques, the generated warped images appear blurred. As a result, the generated warped images using such imaging equipment and techniques are suboptimal.

Therefore, in light of the foregoing discussion, there exists a need to overcome the aforementioned drawbacks associated with generating images for display apparatuses.

SUMMARY

The present disclosure seeks to provide an imaging system for producing images for a display apparatus. The present disclosure also seeks to provide a method for producing images for a display apparatus. The present disclosure seeks to provide a solution to the existing problem associated with a low autofocus speed of autofocusing mechanisms employed by conventional imaging equipment and techniques. An aim of the present disclosure is to provide a solution that overcomes at least partially the problems encountered in prior art, and provides an efficient imaging system that produces images for the display apparatus using an extremely high autofocus speed.

In one aspect, an embodiment of the present disclosure provides an imaging system for producing images for a display apparatus, the imaging system comprising:

at least one imaging unit arranged to face a given real-world scene, a given imaging unit comprising:
   a camera;
   an optical element that comprises at least a first optical portion and a second optical portion having different focal lengths, wherein a first focal length of the first optical portion is smaller than a second focal length of the second optical portion; and
   means for adjusting an optical focus of the given imaging unit; and
a processor communicably coupled to the at least one imaging unit, wherein the processor is configured to:
   obtain, from the display apparatus, information indicative of a gaze direction of a user;
   determine, based on the gaze direction of the user, a region of interest within the given real-world scene; and
   control the means for adjusting the optical focus of the given imaging unit, based on the focal lengths of the first optical portion and the second optical portion, to capture at least one warped image of the given real-world scene, the at least one warped image having a spatially-uniform angular resolution.

In another aspect, an embodiment of the present disclosure provides a method for producing images for a display apparatus, the method being implemented via an imaging system comprising at least one imaging unit arranged to face a given real-world scene, a given imaging unit comprising a camera, an optical element that comprises at least a first optical portion and a second optical portion having different focal lengths, wherein a first focal length of the first optical portion is smaller than a second focal length of the second optical portion, and means for adjusting an optical focus of the given imaging unit, the method comprising:

obtaining, from the display apparatus, information indicative of a gaze direction of a user;

determining, based on the gaze direction of the user, a region of interest within the given real-world scene; and adjusting an optical focus of the given imaging unit, based on the focal lengths of the first optical portion and the second optical portion, to capture at least one warped image of the given real-world scene, the at least one warped image having a spatially-uniform angular resolution.

Embodiments of the present disclosure substantially eliminate or at least partially address the aforementioned problems in the prior art, and enables high speed adjustment of optical focus within the imaging system for producing gaze-contingent warped images in real time or near-real time for a display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
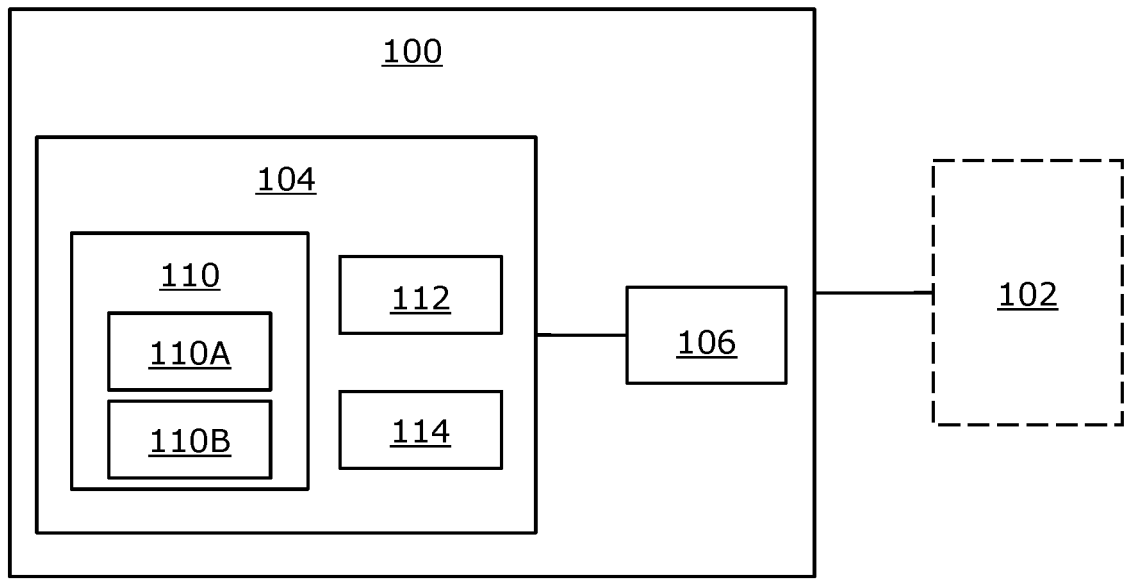
FIGS. 1, 2 and 3 illustrate block diagrams of architectures of an imaging system for producing images for a display apparatus, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an imaging system for producing images for a display apparatus, the imaging system comprising:

at least one imaging unit arranged to face a given real-world scene, a given imaging unit comprising:

a camera;

an optical element that comprises at least a first optical portion and a second optical portion having different focal lengths, wherein a first focal length of the first optical portion is smaller than a second focal length of the second optical portion; and means for adjusting an optical focus of the given imaging unit; and a processor communicably coupled to the at least one imaging unit, wherein the processor is configured to:

obtain, from the display apparatus, information indicative of a gaze direction of a user;

determine, based on the gaze direction of the user, a region of interest within the given real-world scene; and control the means for adjusting the optical focus of the given imaging unit, based on the focal lengths of the first optical portion and the second optical portion, to capture at least one warped image of the given real-world scene, the at least one warped image having a spatially-uniform angular resolution.

In another aspect, an embodiment of the present disclosure provides a method for producing images for a display apparatus, the method being implemented via an imaging system comprising at least one imaging unit arranged to face a given real-world scene, a given imaging unit comprising a camera, an optical element that comprises at least a first optical portion and a second optical portion having different focal lengths, wherein a first focal length of the first optical portion is smaller than a second focal length of the second optical portion, and means for adjusting an optical focus of the given imaging unit, the method comprising:

obtaining, from the display apparatus, information indicative of a gaze direction of a user;

determining, based on the gaze direction of the user, a region of interest within the given real-world scene; and adjusting an optical focus of the given imaging unit, based on the focal lengths of the first optical portion and the second optical portion, to capture at least one warped image of the given real-world scene, the at least one warped image having a spatially-uniform angular resolution.

Embodiments of the present disclosure substantially eliminate or at least partially address the aforementioned problems in the prior art, and enables high speed adjustment of optical focus within the imaging system for producing gaze-contingent warped images in real time or near-real time for a display apparatus.

The present disclosure provides the aforementioned imaging system and the aforementioned method for producing images for the display apparatus. The at least one warped image produced by the imaging system has a wide field of view and is gaze-contingent since the imaging system efficiently utilizes the information indicative of the gaze direction of the user for adjusting optical focus of the given imaging unit. The at least one warped image, upon being de-warped, provides high and spatially variable angular resolution in at least one de-warped image to emulate human eye resolution. Therefore, when the user is presented the at least one de-warped by the display apparatus, the user experiences considerable immersion within given real-world scene. The imaging system implements physical adjustments and/or processing-based adjustments to provide the user with a high autofocus speed based on the detected gaze direction of the user, thereby improving the users experience of an XR environment. Beneficially said adjustments are made in real time or near-real time, and therefore the at least one warped image is generated at a very high speed. Moreover, the method described herein is computationally efficient.

Throughout the present disclosure, the term "imaging system" refers to specialized equipment for producing images for the display apparatus. It will be appreciated that the imaging system produces said images in real time or near real time. Optionally, a focusing distance of the imaging system lies in a range of 20 cm to infinity. More optionally, the focusing distance of the imaging system lies in a range of 50 cm to infinity. For example, the focusing distance of the imaging system may be from 20, 25, 30, 35, 40, 45, 50, 55, 60, 65, 70, 75, 80, 85, 90, 95, 100, 105, 110, 115 or 120 cm up to 25, 30, 35, 40, 45, 50, 55, 60, 65, 70, 75, 80, 85, 90, 95, 100, 105, 110, 115, 120 or infinity cm. Herein, the term "focusing distance" refers to a distance between a focusing plane in the imaging system and a point/region of focusing in the real-world environment. The focusing distance may also be understood to be a "focusing depth" or an "optical depth of focusing".

Throughout the present disclosure, the term "display apparatus" refers to specialized equipment that is configured to present an extended-reality (XR) environment to the user when the display apparatus in operation is worn by the user on his/her head. In such an instance, the display apparatus acts as a device (for example, such as an XR headset, a pair of XR glasses, and so forth) that is operable to present a visual scene of the XR environment to the user. The display apparatus may also commonly be referred to as "head-mounted display apparatus". The term "extended-reality" encompasses virtual reality (VR), augmented reality (AR), mixed reality (MR), and the like.

The imaging system is at least communicably coupled to the display apparatus. By way of such communicable coupling, the imaging system transmits the produced images to the display apparatus. In some implementations, the imaging system is integrated with the display apparatus. In such implementations, the imaging system is physically coupled to the display apparatus (for example, attached via mechanical and electrical connections to components of the display apparatus). In other implementations, the imaging system is implemented on a remote device that is separate from the display apparatus. In such implementations, the imaging system and the display apparatus are communicably coupled via a wired communication interface or a wireless communication interface. Optionally, the imaging system is mounted on the remote device. Examples of the remote device include, but are not limited to, a drone, a vehicle, and a robot. In such an instance, the remote device is physically positioned at a given real-world environment, whereas the user of the display apparatus is positioned away from (for example, at a distance from) the remote device.

Throughout the present disclosure, the term "imaging unit" refers to equipment configured to capture the at least one warped image of the given real-world scene, wherein the at least one warped image is to be utilized by the display apparatus. It will be appreciated that the term "at least one imaging unit" refers to "one imaging unit" in some implementations, and "a plurality of imaging units" in other implementations.

Throughout the present disclosure, the term "camera" refers to equipment that is operable to detect and process light reflected from the given real-world scene, so as to capture the at least one warped image of the given real-world scene. Optionally, the camera comprises a image sensor, wherein the light from the given real-world scene is directed by the optical element onto a photosensitive surface of the image sensor, thereby enabling the camera to capture the at least one warped image of the given real-world scene. The photosensitive surface of the image sensor serves as the focusing plane in the imaging system. In some implementations, the image sensor is curved, whereas in other implementations, the image sensor is planar. Optionally, the camera is implemented as at least one of: a Red-Green-Blue (RGB) camera, a RGB-Depth (RGB-D) camera, a Red-Green-Infrared-Blue (RGIRB) camera, a Red-Green-Complementary-Blue (RGYB) camera, a RGB-Infrared (RGB-IR) 4×4 pattern camera, a Red Clear Clear Blue (RCCB) camera, a Red Clear Clear Clear (RCCC) sensor support-based camera, a stereo camera, a plenoptic camera. In the RGYB camera, the complementary 'Y' color is either a complementary color of green color or a wide wavelength green colour.

Optionally, a size of the image sensor lies in a range of $\frac{1}{5}$ inch diagonal to 1 inch diagonal. The size of the image sensor may, for example, be from $\frac{1}{5}$, 1/4.5, $\frac{1}{4}$, 1/3.5, $\frac{1}{3}$, 1/2.5, $\frac{1}{2}$, 1/1.8 or $\frac{2}{3}$ inch diagonal up to 1/4.5, $\frac{1}{4}$, 1/3.5, $\frac{1}{3}$, 1/2.5, ½, 1/1.8, ⅔ or 1 inch diagonal. As an example, the size of the image sensor may be 1/3.5 inch diagonal. Other sizes of the image sensor that lie within and outside the aforesaid range are also feasible.

It will be appreciated that the image sensor comprises a plurality of photo-sensitive elements, which collectively form the photo-sensitive surface of the image sensor. A given photo-sensitive element is known as a picture element, or a pixel. Optionally, a size of the given photo-sensitive element lies in a range of 1-3 micrometres. For example, the size of the given photo-sensitive element may be from 0.65, 0.7, 0.8, 1.0, 1.25, 1.5, 1.75, 2.0, 2.25, 2.5 or 2.75 micrometres up to 1.25, 1.5, 1.75, 2.0, 2.25, 2.5, 2.75 or 3.0 micrometres. Other sizes of the given photo-sensitive element that lie within and outside the aforesaid range are also feasible. It will be appreciated that the plurality of photo-sensitive elements may be arranged in groups of photo-sensitive elements having a same colour or a different colour, wherein the groups form a Bayer pattern. For example, the plurality of photo-sensitive elements may be arranged in groups of four or nine photo-sensitive elements having a same colour. Optionally, the plurality of photo-sensitive elements are binned to form at least one super-photo-sensitive element. For example, four pixels may be binned (for example, in analog manner) to form one super-pixel.

Throughout the present disclosure, the term "optical element" refers to a configuration of one or more optical components (for example, such as lenses, prisms, mirrors and so forth) that is capable of modifying the light passing therethrough or reflecting therefrom. The optical element is arranged on an optical path of light emanating from the given real-world scene, between the given real-world scene and the camera. The optical element serves as camera optics of the camera of the given imaging unit. Optionally, the optical element is arranged in a manner that the light from the given real-world scene is directed onto the photosensitive surface of the image sensor of the camera, thereby enabling the camera to capture the at least one warped image of the given real-world scene.

The terms "first optical portion" and "second optical portion" refer to different portions of the optical element having different focal lengths. A projection of a first region of the given real-world scene passes through or reflects from the first optical portion, while a projection of a second region of the given real-world scene passes through or reflects from the second optical portion, when the at least one imaging unit captures the at least one warped image. The projections of the first region and the second region of the given-real world scene correspond to a first warped portion and a second warped portion of the at least one warped image, respectively.

Optionally, the optical element is implemented as at least one of: a lens, a mirror, a prism. Optionally, the optical element is implemented as a single lens having a complex shape. As an example, such a lens may have an aspheric shape. Optionally, the single lens is implemented as any of: a Fresnel lens, a Liquid Crystal (LC) lens or a liquid lens. Alternatively, optionally, the optical element is implemented as a single mirror having a complex shape. As an example, a reflective surface of such a mirror may have an aspheric shape. Yet alternatively, optionally, the optical element is implemented as a configuration of multiple lenses and/or mirrors. Optionally, in such a case, the first optical portion and the second optical portion are implemented as separate optical elements.

Optionally, the optical element is asymmetrical with respect to its optical axis. In such a case, the first optical portion and the second optical portion are positioned asymmetrically with respect to the optical axis of the optical element. Alternatively, optionally, the optical element is symmetrical with respect to its optical axis. In such a case, the second optical portion surrounds an optical center of the optical element, wherein a center of the second optical portion coincides with the optical center of the optical element. Moreover, the first optical portion surrounds the second optical portion, and the first optical portion is surrounded by a periphery of the optical element. Optionally, when the optical element is symmetrical with respect to its optical axis, the first optical portion and the second optical portion are concentric to each other.

It will be appreciated that the first and second optical portions of the optical element have different focal lengths. In other words, the optical element has a variable focal length. Notably, the focal length of a given optical portion is inversely related to an optical power of the given optical portion. A first focal length of the first optical portion is smaller than a second focal length of the second optical portion. Within a given optical portion of the optical element, focal length may be constant or variable. Optionally, a focal length of the given optical portion may vary across the given optical portion in a manner that the focal length reduces on going away from a centre of the given optical portion towards a periphery of the given optical portion. A technical effect of variable focal length in the given optical portion is that it leads to a gradual spatial variation in focal length across the different optical portions of the optical element, which in turn provides a gradual distortion in the at least one warped image. When the at least one warped image is de-warped (optically and/or digitally) to generate at least one de-warped image, there is produced a gradual change in angular resolution within the at least one de-warped image.

Optionally, the first focal length of the first optical portion in a range of 0.5 mm to 2.5 mm, and the second focal length of the second optical portion lies in a range of 2.7 mm-8 mm. More optionally, the first focal length of the first optical portion in a range of 1.7 mm to 2.3 mm, and the second focal length of the second optical portion lies in a range of 2.7 mm-4.5 mm. Yet more optionally, the first focal length of the first optical portion in a range of 1.75 mm to 2.25 mm, and the second focal length of the second optical portion lies in a range of 3.5 mm-4.5 mm. For example, the first focal length of the first optical portion may be from 0.5, 0.75, 1.0, 1.25, 1.5, 1.75, 2.0, or 2.25 mm up to 0.75, 1.0, 1.25, 1.5, 1.75, 2.0, 2.25, or 2.5 mm. The second focal length of the second optical portion may be from 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, or 7.9 mm up to 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8.0 mm. Other values of the first focal length and the second focal length that lie within and outside the aforesaid ranges are also feasible.

It will be appreciated that since the first and second optical portions of the optical element have different focal lengths, the first and second optical portions have different focal planes (namely, planes at which said optical elements focus) within the given real-world scene. Moreover, the first and second optical portions of the optical element have different depths of field. Notably, the depth of field of a given optical portion is inversely proportional to a focal length of the given optical portion. The depths of field of the first and second optical portions change differently as a function of movement of the optical element due to the variable focal length of the optical element. As an example, a magnitude of change in optical focus (for example, in centimeters) within the given real-world scene when the means for adjusting focus moves the optical element by a specific distance (for example, in micrometers) is different for different optical portions of the optical element. Consequently, the depth of field varies as well, as a function of gaze direction (since the optical focus is adjusted based on the detected gaze direction).

Optionally, the focal length of the optical element varies as a function of angular distance from the center of the second optical portion. Optionally, in this regard, the focal length is maximum along an axis passing through the center of the second optical portion, and decreases on going away from said center. The function of the angular distance from the centre of the second optical portion may be linear or non-linear. Examples of the function include, but are not limited to, a gaussian function, a step function, and a ramp function. It will be appreciated that since a geometry of the optical element is constant, its focal length in each direction is pre-known (notably, by measurement or calculation). In an example, the focal length of the optical element along the axis passing through the center of the second optical portion may be 7 millimeters, whereas the focal length of the optical element at an angular distance of 30 degrees from said axis may be 5 millimeters. One such example variation of the focal length of the optical element has been illustrated in conjunction with FIG. 6, as described below.

Furthermore, a given focal length of a given optical portion determines an extent to which a projection of a given region of the given real-world scene would appear magnified when viewed through the given optical portion. The first and second optical portions have different optical properties with respect to magnification. Notably, the first and second optical portions are capable of differently magnifying the projections of the first and second regions of the given real-world scene, respectively, thereby enabling the at least one warped image to be captured. Notably, an optical portion having a larger focal length magnifies a projection of the given region of the given real-world scene passing therethrough to a greater extent as compared to another optical portion having a smaller focal length. It will be appreciated that the projections of the first and second regions of the given real-world scene are significantly distorted upon being differently magnified via the first and second optical portions, respectively. Upon being differently magnified, the projections of the first and the second regions of the given real-world scene produce at the camera the first warped portion and the second warped portion of the at least one warped image, respectively.

It will be appreciated that an angular resolution of the captured at least one warped image is spatially-uniform. By "spatially-uniform angular resolution", it is meant that the angular resolution of the at least one warped image is uniform across an imaginary plane on which the at least one warped image is produced. In other words, a number of pixels/points per degree which constitute the warped image is same throughout an angular width of the at least one warped image. This is so because the pixels of the image sensor are uniformly spaced. Optionally, said image plane corresponds to the image sensor of the camera. Throughout the present disclosure, the term "angular resolution" of a given image refers to a number of pixels per degree or points per degree (both abbreviated as 'PPD') of an angular width of a given portion of the given image, wherein the angular width is measured from an imaginary point in a three-dimensional space.

By "warped", it means that a given image would appear distorted if viewed as such. Notably, a number of pixels employed to capture the second region of the given-real world scene using the imaging system will be more as compared to a number of pixels employed to capture the second region of the given-real world scene using an imaging system without the optical element. Moreover, an angle of field of view captured by each pixel used for capturing the second region of the given real-world scene is less than an angle of field of view captured by each pixel used for capturing the first region of the given real-world scene. However, the pixels corresponding to the image sensor of the camera are uniformly spaced. Therefore, the at least one warped image captured by the camera will have the spatially-uniform angular resolution.

Optionally, the first optical portion substantially surrounds the second optical portion, wherein the second focal length of the second optical portion is more than 1.25 times of the first focal length of the first optical portion. In other words, a ratio of the second focal length and the first focal length is greater than 1.25. For example, the second focal length may be 1.25, 1.3, 1.35, 1.4, 1.45, 1.5, 1.75, 2.0, 2.25, 2.5, 2.75, 3.0, 3.25, 3.5, 3.75, 4, 4.25, 4.5, 4.75, 5, 5.25, 5.5, 5.75, 6, and so forth, times of the first focal length. Other ratios of the second focal length to the first focal length besides the aforementioned values are also feasible. As a result of high focal length difference therebetween, the second optical portion magnifies the projection of the second region of the given real-world scene passing therethrough to a greater extent (i.e., optionally more than 1.25 times) as compared to how the first optical portion magnifies the projection of the first region of the given real-world scene passing therethrough. When the at least one warped image is de-warped to produce the at least one de-warped image for being displayed via the display apparatus, the first warped portion corresponds to a first de-warped portion of the at least one de-warped image and the second warped portion corresponds to a second de-warped portion of the at least one de-warped image. Notably, the first de-warped portion forms a low-resolution area and the second de-warped portion forms a high-resolution area of the at least one de-warped image.

It will be appreciated that the at least one de-warped image produced for being displayed via the display apparatus has a spatially-variable angular resolution. By "spatially-variable angular resolution", it is meant that an angular resolution of the at least one de-warped image varies spatially across an imaginary plane on which the at least one de-warped image is produced and/or incident. Notably, a high ratio of the second focal length to the first focal length enables in maximizing angular resolution obtained in the at least one de-warped image (and specifically, in the second de-warped portion of the at least one de-warped image).

Optionally, an angular resolution of the second de-warped portion of the at least one de-warped image is greater than 35 PPD. The angular resolution of the second de-warped portion may, for example, be 35 PPD, 40 PPD, 45 PPD, 50 PPD, 55 PPD, 60 PPD, 65 PPD, 70 PPD, 75 PPD, and so on. Optionally, an angular resolution of the first de-warped portion of the at least one de-warped image is greater than 10 PPD. The angular resolution of the first de-warped portion may, for example, be 10 PPD, 15 PPD, 20 PPD, 25 PPD, 30 PPD, 35 PPD, 40 PPD, and so on.

It will be appreciated that the first focal length of the first optical portion and the second focal length of the second optical portion of the optical element, and optionally the size of the given photo-sensitive element of the image sensor enable provision of the spatially variable angular resolution that emulates human eye resolution, in the at least one de-warped image. These focal lengths and the size of the given photo-sensitive element define angular resolution that would be achieved in the at least one de-warped image. In particular, a high ratio of the second focal length of the second optical portion to the first focal length of the first optical portion facilitates in mimicking the human eye resolution and human eye field of view. For example, when pixel size is 1.4 um, a (relatively long) focal length of 4 mm may be required for the second optical portion of the optical element in order for a corresponding second de-warped portion of the at least one de-warped image to reach human eye angular resolution of over 60 PPD with appropriate image sensor.

While applying a de-warping effect, the first warped portion and the second warped portion of the at least one warped image would be differently magnified to produce the first de-warped portion and the second de-warped portion of the at least one de-warped image, respectively. Notably, the magnification effect provided whilst de-warping the at least one warped image is inverse of the magnification effect provided whilst capturing the at least one warped image. Specifically, the second warped portion is inversely magnified to a greater extent than the first warped portion. As a result, pixels corresponding to the second de-warped portion would appear smaller and closer than pixels corresponding to the first de-warped portion. In other words, an angular resolution of the second de-warped portion is greater than an angular resolution of the first de-warped portion. Therefore, the at least one de-warped image being displayed via the display apparatus has the spatially-variable angular resolution.

Optionally, the optical element further comprises at least one intermediary optical portion between the first optical portion and the second optical portion, the at least one intermediary optical portion having a focal length that is different from the first focal length and the second focal length. As a result, the at least one intermediary optical portion has different depth of field and different optical properties with respect to magnification as compared to the first optical portion and the second optical portion. Optionally, a third focal length of the at least one intermediary optical portion may be higher than the first focal length, but smaller than the second focal length.

Optionally, the at least one intermediary optical portion comprises a single intermediary optical portion or a plurality of intermediary optical portions. Throughout the present disclosure, the term "intermediary optical portion" refers to a portion of the optical element that lies between the first optical portion and the second optical portion. In other words, an intermediary optical portion is a portion of the optical element that surrounds the second optical portion, and is surrounded by the first optical portion.

Throughout the present disclosure, the term "means for adjusting the optical focus" refers to a specialized equipment for adjusting the optical focus of the at least one imaging unit. Notably, the means for adjusting the optical focus is employed to adjust at least one focusing parameter of the optical element to achieve a required optical focus for the region of interest within the given real-world scene. When the region of interest is "in focus", a representation of said region within the at least one warped image appears extremely sharp. Alternatively, when the region of interest is "out of focus", a representation of said region within the at least one warped image appears blurred. In the at least one warped image, the region of interest is represented by the second warped portion, while a remaining region of the given real-world scene is represented by the first warped portion.

Optionally, the means for adjusting the optical focus adjusts the focus of the at least one imaging unit by employing an active autofocus mechanism or a passive autofocus mechanism. The active autofocus mechanism is implemented using at least one of: an ultrasonic wave emitter, an infrared light emitter, a Light Detection and Ranging (LIDAR) camera, a Time-of-Flight (ToF) camera. Said active autofocus mechanism emits signals to measure distance to the at least one object independently, and subsequently adjust the optical element for achieving a required optical focus. The passive autofocus mechanism is implemented by a processing device that is configured to analyze phase and/or contrast within at least one reference image of the given real-world scene, and subsequently adjusts the optical element for achieving a required optical focus. Such active autofocus mechanisms and passive autofocus mechanisms are well-known in the art.

Throughout the present disclosure, the term "processor" refers to hardware, software, firmware or a combination of these. The processor controls operation of the imaging system. The processor is communicably coupled to the at least one imaging unit in a wireless manner and/or in a wired manner. By way of such coupling, the processor obtains the at least one image from the at least one imaging unit. As an example, the imaging system may be mounted on a robot in a manner that the at least one imaging unit is mounted on an outer surface of the robot. In such an example, the processor may be wirelessly coupled to the at least one imaging unit.

Optionally, the display apparatus comprises means for detecting the gaze direction, wherein the means for detecting the gaze direction is configured to generate the information indicative of the gaze direction of the user. The means for detecting the gaze direction, in operation, captures gaze-tracking data, wherein the gaze-tracking data constitutes the information indicative of the gaze direction of the user. Moreover, optionally, the information indicative of the gaze direction comprises gaze vectors representing the gaze directions of the user's eyes. Said information is then communicated from the display apparatus to the processor. The processor is at least coupled in communication with the display apparatus.

Throughout the present disclosure, the term "means for detecting the gaze direction" refers to specialized equipment for detecting and/or following a direction of gaze of the user of the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of a projection of the at least one de-warped image (that is to be shown to the user). It is to be understood that the means for tracking the gaze direction may also be referred to as an "eye-tracker system", a "gaze-tracking system" or a "means for tracking the gaze direction".

As an example, the means for detecting gaze direction may be implemented using a set of illuminators for emitting light to illuminate the user's eye, a gaze-tracking camera for capturing an image of reflections of the light from the user's eye, and a processing unit coupled in communication with the set of illuminators and the gaze-tracking camera, wherein the processing unit is configured to detect the gaze direction of the user using the captured image.

Throughout the present disclosure, the term "de-warped image" refers to an image that is produced by applying the de-warping effect to the at least one warped image. The imaging system produces the at least one warped image, and components of the display apparatus apply the de-warping effect to the at least one warped image for producing the at least one de-warped image. The de-warping effect is applied optically (for example, using at least one optical de-warping element), or via image processing. Said de-warping effect is an inverse of a warping effect that is provided by the optical element whilst capturing the at least one warped image.

Optionally, a given image is displayed to the user via at least one image renderer of the display apparatus. Herein, the term "image renderer" refers to equipment that, in operation, renders the given image that is to be displayed to the user of the display apparatus. The given image could be a warped image, or a de-warped image, depending on the components and functionality of the display apparatus. Optionally, the at least one image renderer is implemented as at least one display. Optionally, the at least one image renderer is implemented as at least one projector. In this regard, the given image is projected onto a projection screen or directly onto a retina of the user's eyes.

Optionally, the image renderer is implemented as a Fovea Contingent Display (FCD), wherein the FCD comprises a first display having a first display resolution and a second display having a second display resolution, the second display resolution being higher than the first display resolution. It will be appreciated that the FCD is designed to imitate a physiology of human vision. The FCD allows for increasing immersion and realism within the XR environment.

Optionally, the display apparatus further comprises an exit optical element. The term "exit optical element" refers to an optical component that is configured to direct a projection of the at least one de-warped image towards the user's eyes, when the display apparatus is worn by the user. The term "exit optical element" is also commonly referred to as an "eyepiece". Optionally, the exit optical element is implemented by way of at least one of: a convex lens, a plano-convex lens, a Liquid Crystal (LC) lens, a liquid lens, a Fresnel lens, a spherical lens, a chromatic lens.

Throughout the present disclosure, the term "region of interest" refers to a region of the given real-world scene whereat the gaze direction of the user's eyes are focused, at a given point of time. Notably, the region of interest corresponds to the second region of the given real-world scene. It will be appreciated that the region of interest is a fixation region within the given real-world scene. Therefore, the region of interest is a region of focus of the user's gaze within the given real-world scene. Furthermore, it is to be understood that the region of interest relates to a region that would be resolved to a much greater detail as compared to other regions of given real-world scene, if the given real-world scene were viewed by a human visual system (namely, by the user's eyes).

The processor controls the means for adjusting the optical focus of the given imaging unit for adjusting the optical focus in a manner that the at least one object is "in focus" within the at least one warped image. Given the focal lengths of the first optical portion and the second optical portion, the optical element is required to be adjusted by the means for adjusting the optical focus, in order to properly capture the at least one warped image. The processor controls the means for adjusting the optical focus to provide such required adjustment of the optical element. Optionally, the adjustment of the optical focus of the given imaging unit is performed iteratively.

Optionally, when controlling the means for adjusting the optical focus of the given imaging unit, the processor is configured to adjust, based on the gaze direction of the user, at least one focusing parameter of the optical element. Notably, different gaze directions correspond to different focal lengths of the optical element. A given focal length requires a specific manner of adjusting focus. Therefore, for different focal lengths (of the optical element) corresponding to different gaze directions, the at least one focusing parameter is adjusted differently.

Optionally, the at least one focusing parameter of the optical element is adjusted in a step-wise manner. Optionally, said adjustment is made according to a Hill-climbing focusing algorithm. In such a case, after each step of adjustment, the processor checks whether or not the required optical focus of the given imaging unit is achieved. If the required optical focus of the given imaging unit is achieved, said step-wise adjustment is complete. If the required optical focus of the given imaging unit is not achieved, a subsequent step of the step-wise adjustment is implemented. It will be appreciated that in order for fast autofocusing, a number of steps (i.e., iterations) required to adjust the at least one focusing parameter of the optical element is required to be minimized.

Optionally, when checking whether or not the required optical focus of the given imaging unit is achieved, the processor is configured to perform contrast analysis of a previously-captured warped image. Optionally, when performing the contrast analysis, the processor is configured to: determine differences in intensities between adjacent image segments of a previously-captured warped image, the previously-captured warped image having been captured corresponding to previous focal lengths of the different optical portions of the optical element; and determine a previous contrast resolution of the previously-captured warped image, based on said differences in intensities. Then, optionally, the processor is configured to: determine a required adjustment in the previous focal lengths of the different optical portions of the optical element which, when implemented, would cause a next contrast resolution of a next warped image to be higher than the previous contrast resolution of the previously-captured warped image; and control the means for adjusting the optical focus to implement the required adjustment in the previous focal lengths of the different optical portions of the optical element. The contrast analysis may be performed until a maximal contrast resolution (and its corresponding focal lengths of the different optical portions of the optical element) are achieved. A given image segment of a given image may be a local or a global image segment, and may correspond to a point or an area within the given image.

Optionally, the at least one focusing parameter is at least one of: step size of a coarse focusing step, step size of a fine focusing step, step size of a return focusing step, a number of course focusing steps to be implemented, a number of fine focusing steps to be implemented, a number of return focusing steps to be implemented. It will be appreciated that an optimal step size that is required for a given speed of autofocusing, is dependent on focal length of camera optics (i.e., the different focal lengths of the optical element).

Herein, the term "focusing step" refers to a measure of actuation (for example, displacement) of the optical element or to a measure of dynamic control of a parameter (for example, a curvature, properties of an active medium, and similar) of an optical element.

Moreover, optionally, the at least one focusing parameter is calculated based upon at least one of: a required blur value, a required final size of a circle of confusion, a focal length of the optical element, a required full displacement of the optical element. It will be appreciated that different focal lengths require different focusing parameters. As an example, the step size of the coarse focusing step may be calculated by using a 2 pixel size of the circle of confusion, whereas the step size of the fine focusing step may be calculated by using a 1 pixel size or a 0.5 pixel size of the circle of confusion. Optionally, when calculating the at least one focusing parameter, the processor is configured to: determine the focal length of the optical element along the gaze direction of the user, and determine the at least one focusing parameter based on the focal length of the optical element. In such a case, the gaze vectors of the user's eyes are mapped with the optical element to determine the focal length of the optical element along the gaze direction of the user.

Optionally, the step size of at least one of: the coarse focusing step, the fine focusing step, the return focusing step is calculated based upon:

the required full displacement of the optical element,
the number of at least one of: course focusing steps, fine focusing steps, return focusing steps to be implemented, and
the required final size of the circle of confusion.

It will be appreciated that the aforesaid step size(s) is/are selected in a manner that a resolution peak of the Hill-climbing focusing algorithm is not missed while adjusting the optical focus of the given imaging unit. The number of at least one of: course focusing steps, fine focusing steps, return focusing steps to be implemented is selected in a manner that said number is neither too many nor too less, thereby ensuring that no resolution peak of the Hill-climbing focusing algorithm is missed.

For illustration purposes only, there will now be considered an example wherein the required blur value B (associated with a given pixel pitch equal to 2 micrometers and a given size of the circle of confusion equal to 2 pixel size, or 4 micrometers) is equal to 4 micrometers, an aperture of the optical element is equal to 2.8 and the focal length of the optical element is equal to 2.5 millimeters. In such an example, the step size of the coarse focusing step may be calculated using the following mathematical formula:

$$\text{Step size} = (2 \ast B \ast Fno \ast f^2)/(f - B \ast Fno)^2$$

wherein, 'B' represents the required blur value associated with the given pixel pitch and the given size of the circle of confusion, 'Fno' represents the aperture of the optical element; and 'F' represents the focal length of the optical element.

Upon substituting the example values in said formula, the step size of the coarse focusing step is calculated to be 22.60 micrometers.

Moreover, when a required full displacement (namely, the required adjustment) of the optical element is 31.65 micrometers, the number of coarse focusing steps to be implemented for the optical element is equal to 1.4 (notably, equal to 31.65/22.60 steps). Therefore, the means for adjusting the optical focus adjusts the optical element is by implementing less than 2 coarse focusing steps to achieve the required full displacement.

Optionally, the required full displacement of the optical element is calculated based on the gaze direction of the user. Optionally, in this regard, the required full displacement of the optical element is calculated according to the focal length of the optical element along the gaze direction of the user and a required focusing distance of the imaging system. Optionally, said required full displacement of the optical element is calculated using the following mathematical formula:

$$d = (((1/f) - (1/D))^{-1} - f) \times 1000$$

wherein, 'd' represents the required full displacement of the optical element, 'f' represents the focal length of the optical element, and 'D' represents the focusing distance.

For illustration purposes only, there are now provided exemplary calculations of the step size of the coarse focusing step and the required full displacement of the optical element for various focal lengths of the optical element in the table given below.

| | Angular distance | | | | |
| --- | --- | --- | --- | --- | --- |
| | 0 degrees | 10 degrees | 20 degrees | 30 degrees | 40 degrees |
| Focal length (f) in millimeters | 6.5 | 5.5 | 4.5 | 3.5 | 2.5 |
| Number of coarse focusing steps to achieve optical focus for D = 200 millimeters | 9.7 | 6.9 | 4.6 | 2.8 | 1.4 |
| Step size of a coarse focusing step in micrometers | 22.48 | 22.49 | 22.51 | 22.54 | 22.6 |
| Required full displacement of the optical element (d) in micrometers for D = 200 mm | 218.35 | 155.53 | 103.58 | 62.34 | 31.65 |
| Stepwise adjustment of the optical element in micrometers | 22.48 44.96 67.44 89.92 112.4 134.88 157.36 179.84 202.32 224.8 | 22.49 44.98 67.47 89.96 112.45 134.94 157.43 | 22.51 45.02 67.53 90.04 112.55 | 22.54 45.08 67.62 | 22.6 45.2 |

Notably, in the aforementioned exemplary calculations, it will be appreciated that similar adjustment of the optical element for different focal lengths cause the optical element to focus at considerably different focusing distances. For example, upon 3 steps of adjustment of the optical element having the focal lengths equal to 6.5 millimeters, 5.5 millimeters, 4.5 millimeters, and 3.5 millimeters, the overall focal length adjustment of the optical element would be 67.44 micrometers, 67.47 micrometers, 67.53 micrometers, and 67.62 micrometers, respectively. In such a case, when the optical element has the 6.5 millimeters focal length, the optical element would focus at a focusing distance of approximately 630 millimeters, when the optical element has the 5.5 millimeters focal length, the optical element would focus at a focusing distance of approximately 450 millimeters, when the optical element has the 4.5 millimeters focal length, the optical element would focus at a focusing distance of approximately 304 millimeters, and when the optical element has the 3.5 millimeters focal length, the optical element would focus at a focusing distance that is less than 200 millimeters.

Optionally, the processor is configured to generate a first data structure indicative of a plurality of gaze directions of the user and their corresponding focal lengths of the optical element. Moreover, optionally, the processor is configured to generate a second data structure indicative of a plurality of focal lengths of the optical element and their corresponding values of the at least one focusing parameter. In operation, the processor optionally accesses the first data structure to select a requisite focal length of the optical element according to a current gaze direction, and then accesses the second data structure to select a requisite value of the at least one focusing parameter according to said focal length (which is used as an index for such selection). The first data structure and the second data structure could be separate data structures or could be integrated into a single data structure. Optionally, a given data structure is implemented as one of: a tree, an array, a linked list. Other types of data structures are also feasible.

Optionally, the processor is configured to store the first data structure and/or the second data structure at a data repository coupled in communication with the imaging system. The data repository is implemented as a memory of the imaging system, a memory of the HMD coupled to the imaging system, a cloud-based memory, or similar.

Optionally, the imaging system further comprises means for generating a depth or voxel map of the given real-world scene, wherein the processor is configured to:

determine, based on the depth or voxel map of the given real-world scene, an optical depth of at least one object present in the region of interest; and control the means for adjusting the optical focus of the given imaging unit, based also on the optical depth of at least one object, to capture the at least one warped image of the given real-world scene.

Throughout the present disclosure, the term "means for generating the depth or the voxel map" refers to equipment and/or techniques configured to record and represent optical depth (namely, optical distance) of the given real-world scene. Said means provides a frame of reference from which the optical depth of any point within the given real-world scene can be extracted.

Optionally, the means for generating the depth map or the voxel map comprises an imaging device configured to capture a depth image (namely, an image depicting depth) of the given real-world scene to generate the depth map or the voxel map of the given real-world scene. Optionally, in this regard, the depth image is a two-dimensional image or a three-dimensional image. Optionally, the captured depth image requires further processing to accurately represent the optical depth of the given real-world scene. Furthermore, it will be appreciated that the imaging device could be a two-dimensional camera or a depth camera (namely, a ranging camera). Examples of the imaging device include, but are not limited to, a digital camera, an Red-Green-Blue-Depth (RGB-D) camera, a ranging camera, a LiDAR camera, a flash LiDAR camera, a ToF camera, a Sound Navigation and Ranging (SONAR) camera, a laser rangefinder, a stereo camera, a plenoptic camera, an infrared camera, and an ultrasound imaging equipment.

Additionally, optionally, the means for generating the depth map or the voxel map comprises a processing module coupled to the imaging device, wherein the processing module is configured to process the captured depth image for generating the depth map or the voxel map of the given real-world scene. In an example, the imaging device may be a stereo camera configured to capture a three-dimensional depth image of the given real-world scene. The processing module coupled to the stereo camera may process said depth image to create a disparity map that may be employed to generate the depth map or the voxel map of the given real-world scene. In another example, the means for generating the depth map or the voxel map may be implemented on a surveying device, wherein the surveying device may be arranged to move within the real world scene for (i) capturing the depth image of the given real-world scene using the imaging device, and (ii) employing Simultaneous Localization and Mapping (SLAM) algorithm to process the captured depth image for generating the depth map or the voxel map of the given real-world scene.

Throughout the present disclosure, the term "depth map" relates to a data structure comprising information pertaining to the optical depth of the given real-world scene. Optionally, the depth map is an image comprising a plurality of pixels, wherein a color of each pixel indicates optical depth of its corresponding point(s) within the given real-world scene. As an example, the depth map may be a grayscale image wherein each pixel is associated with a single monochromatic color having intensity ranging from black color (namely, maximum intensity) to white color (namely, minimum intensity), wherein a black colored-pixel depicts maximum optical depth (namely, largest optical distance) of its corresponding point within the given real-world scene, whilst a white colored pixel depicts minimum optical depth (namely, smallest optical distance) of its corresponding point within the given real-world scene.

Furthermore, throughout the present disclosure, the term "voxel map" used herein relates to a data structure comprising a plurality of three-dimensional volume elements that constitute the given real-world scene, wherein each three-dimensional volume element represents a three-dimensional region within the given real-world scene. A given three-dimensional volume element is indicative of the optical depth of its corresponding region(s) within the given real-world scene.

Optionally, the depth or voxel map is generated in real time. Alternatively, optionally, the depth or voxel map is generated a priori. In such a case, the means for generating generates (and optionally, analyses) the information pertaining to the optical depth of the given real-world scene at a specific time prior to capture of the at least one warped image. Optionally, in this regard, the means for generating updates said information from time to time.

Optionally, when determining the optical depth of at least one object present in the region of interest, the processor is configured to map a current gaze direction of the user to the depth or voxel map. It will be appreciated that "mapping the current gaze direction of the user to the depth or voxel map" refers to a process of associating the current gaze direction of the user with the depth or the voxel map to determine those data structure elements of the depth or the voxel map that substantially correspond to the region of interest within the given real-world scene. Thereafter, the processor extracts optical depth information associated with such data structure elements to determine the optical depth of the at least one object.

It will be appreciated that the "optical depth" of the at least one object present in the region of interest refers to an optical distance between said object and the camera. Moreover, the at least one object present in a region of interest is a fixation object within the given real-world scene. When the gaze direction of the user is directed towards the at least one object, the at least one object is focused onto the fovea of the user's eyes, and is resolved to a much greater detail as compared to the remaining object(s) of the given real-world scene.

Optionally, when controlling the means for adjusting the optical focus of the given imaging unit, the processor is configured to adjust, based also on the optical depth of at least one object, the at least one focusing parameter of the optical element. Different optical depths of objects require different focal lengths of the optical element, in order for the objects to be well-focused. For these different focal lengths (that correspond to different optical depths), the at least one focusing parameter is adjusted differently. Adjustment of the at least one focusing parameter has been described previously. Optionally, a required focusing distance of the imaging system is equal to the optical depth of the at least one object present in the region of interest. Optionally, the required full displacement of the optical element is calculated according to the focal length of the optical element and the optical depth of the at least one object, wherein the optical depth of the at least one object is the required focusing distance of the imaging system.

Optionally, the at least one object comprises a first object and a second object, a first optical depth of the first object being different from a second optical depth of the second object, wherein the processor is configured to:
select a given optical depth that lies between the first optical depth and the second optical depth; and
adjust the optical focus of the given imaging unit, based on the given optical depth, to capture the at least one warped image of the given real-world scene.

Optionally, the given optical depth is selected in a manner that the first optical depth and the second optical depth lie within a depth of field corresponding to the given optical depth. Given the focal lengths of the first and second optical portions, the processor adjusts the optical focus of the given imaging unit in a manner that a region of the given real-world scene that lies at the given optical depth is focused sharply onto the camera. Moreover, since the first optical depth and the second optical depth lie within the depth of field, an entire region of the given real-world scene that lies between the first optical depth and the second optical depth would be focused onto the camera with an acceptable sharpness. Thus, both the first object and the second object would appear sharp in the at least one warped image, despite being at different optical depths. It will be appreciated that by focusing at the given optical depth and utilizing the depth of field, a single imaging unit can capture the at least one warped image in a manner that a range of optical depths within the given real-world scene is captured with acceptable sharpness. Remaining regions of the given real-world scene that lie outside of said range of optical depths would appear blurred within the at least one warped image.

Optionally, the imaging system comprises separate imaging units corresponding to a left eye and a right eye of the user. In such a case, separate depth or voxel maps are generated from a perspective of the left eye and a perspective of the right eye of the user. Therefore, when the first optical depth of the first object is different from the second optical depth of the second object, separate given optical depths are selected for the imaging units corresponding to the left eye and the right eye. Therefore, the optical focus is adjusted differently for both the separate imaging units, based on the separate given optical depths, to capture at least one left-perspective warped image and at least one right-perspective warped image of the given real-world scene. It will be appreciated that the at least one left-perspective warped image and at least one right-perspective warped image are offset from each other. As a result, when the at least one left-perspective warped image and at least one right-perspective warped image are de-warped and shown to the user via the display apparatus, the user would experience considerable realism and immersion within the visual scene, by accurately perceiving stereoscopic depth and focus within the visual scene.

Alternatively, optionally, the at least one object comprises a first object and a second object, a first optical depth of the first object being different from a second optical depth of the second object, the at least one imaging unit comprising a first imaging unit and a second imaging unit, wherein the processor is configured to adjust an optical focus of the first imaging unit and an optical focus of the second imaging unit, based on the first optical depth and the second optical depth, to capture a first warped image and a second warped image of the given real-world scene, respectively. In such a case, the first imaging unit is made to focus at the first optical depth and the second imaging unit is made to focus at the second optical depth. As a result, in the first warped image, the first object appears extremely sharp. Likewise, in the second warped image, the second object appears extremely sharp. Both the first and second warped images can therefore be utilized at the display apparatus to display sharp representations of the first and second objects to the user.

It will be appreciated that using the first and second imaging units to focus at the first and second optical depths is especially useful when the first and second objects lie at the first and second optical depths, respectively, along the gaze direction of the user. In such a case, the user could be looking at either the first object or second object, since both objects lie along his/her gaze direction. By using the first and second imaging units, the imaging system focuses sharply at both the first and second optical depths, in order to capture both said objects sharply. Therefore, when the first and second warped images are utilized at the display apparatus to present the visual scene to the user, both the first and second objects have acceptable sharpness.

Optionally, at the display apparatus, the first warped image is shown to the left eye of the user and the second warped image is shown to the right eye of the user. Since both the first and second warped images are captured using different imaging units, they are offset with respect to each other. When the first and second warped images are shown to the user, the user correctly perceives different optical depths due to his/her stereoscopic vision, whilst also perceiving sharpness of the first and second objects at the first and second optical depths.

Optionally, the means for adjusting the optical focus of the given imaging unit comprises at least one first actuator that, in operation, moves the optical element along an optical axis of the camera of the given imaging unit. In such a case, the at least one first actuator provides a translational motion of the optical element along the optical axis of the camera. By way of such movement, the optical element is moved closer to or away from the camera. This, in turn, changes how the at least one object is focused at the camera (more specifically, at the photosensitive surface of the image sensor). It will be appreciated that the at least one first actuator moves the optical element to a position along the optical axis of the camera at which a sharpest possible focus of the at least one object is achieved. Moreover, the at least one first actuator could be directly coupled or indirectly coupled (for example, via another component) to the optical element.

Throughout the present disclosure, the term "actuator" refers to equipment (for example, such as electrical components, mechanical components, magnetic components, polymeric components, and so forth) that is employed to move its associated component. Optionally, a given actuator moves its associated component using an actuation signal (for example, such as an electric current, hydraulic pressure, and the like). More optionally, the processor controls the given actuator by generating the actuation signal.

Optionally, the means for adjusting the optical focus of the given imaging unit comprises a focusing optical element and at least one second actuator that, in operation, moves the focusing optical element along an optical axis of the camera. Optionally, in this regard, the focusing optical element is positioned on the optical path between the optical element and the camera of the given imaging unit. Herein, the term "focusing element" refers to an optical component that is specifically employed for purposes of adjusting the optical focus of the given imaging unit. Optical properties of the focusing optical element, in combination with optical properties of the optical element, provide a required optical focus of the given imaging unit. The focusing optical element is moved closer to or away from the optical element, along the optical axis of the camera. This changes a separation between the focusing optical element and the optical element. As a result, the optical focus of the given imaging unit also changes. It will be appreciated that the at least one second actuator moves the focusing optical element to a position along the optical axis of the camera whereat a separation between the focusing optical element and the optical element is suitable to achieve a sharpest possible focus of the at least one object. Moreover, the at least one second actuator could be directly coupled or indirectly coupled (for example, via another component) to the focusing optical element.

Optionally, the focusing element is implemented as at least one of: a plano-convex lens, a biconvex lens, a plano-concave lens, a biconcave lens, an aspheric lens, a Fresnel lens. Optionally, when the focusing element is implemented as a plurality of the aforesaid optical sub-components, at least one of the plurality of optical sub-components is movable using the at least one second actuator. As an example, the focusing element may be implemented as a configuration of 5 biconvex lenses, wherein the at least one second actuator may move 3 biconvex lenses among the 5 biconvex lenses along an optical axis of the camera.

Optionally, the means for adjusting the optical focus of the given imaging unit comprises an active focusing optical element, wherein the processor is configured to adjust an active optical characteristic of the active focusing optical element. Examples of said active optical characteristic include, but are not limited to, a focal length and a refractive index. Optionally, in this regard, the active focusing optical element is implemented as one of: a liquid crystal lens, a liquid lens, a polymer lens. The focal length of the active focusing optical element is adjusted by: changing curvature of the active focusing optical element, changing orientation of molecules of an active medium of the active focusing optical element by varying the electric field across said active focusing optical element, and the like. As an example, the active focusing optical element may be implemented as the polymer lens, wherein the processor adjusts the focal length of the polymer lens by controlling a micromechanical actuator coupled to the polymer lens to physically press against the polymer lens for changing the curvature of the polymer lens.

Optionally, the optical element and the means for adjusting the optical focus of the given imaging unit are implemented together as a dynamically-controllable optical element, the focal lengths of the first optical portion and the second optical portion of the optical element being dynamically changeable. In this regard, optical properties of the dynamically-controllable optical element can be adjusted without moving it. Optionally, the processor is configured to dynamically change the focal lengths of the first optical portion and the second optical portion of the dynamically-controllable optical element via a dynamic control signal. Optionally, in this regard, the dynamic control signal is at least one of: an electrical signal, a mechanical signal, a light signal, a thermal signal.

In an embodiment, the dynamic control signal is employed to adjust a curvature of the dynamically-controllable optical element. Optionally, in this regard, the dynamically-controllable optical element is made of an electrically controllable an active polymer or a flexible membrane material. Upon a change in curvature of the dynamically-controllable optical element, the focal lengths of the first optical portion and the second optical portion would also change. Such a change in focal lengths leads to a corresponding change in focus of the given imaging unit. Therefore, by adjusting such a dynamic control signal, the curvature of the dynamically-controllable optical element is adjusted in a manner that required focal lengths of the first optical portion and the second optical portion are provided for achieving a sharpest possible focus of the at least one object.

Optionally, the dynamically-controllable optical element is implemented as one of: a fluid lens, a liquid crystal lens, a polymer lens, a mirror whose curvature can be changed dynamically.

In another embodiment, the dynamic control signal is employed to adjust an active optical characteristic curvature of the dynamically-controllable optical element. In this regard, the dynamically-controllable optical element contains an active medium (for example, such as liquid crystals) that is controllable to adjust the focal lengths of the first optical portion and the second optical portion. Said active medium is controlled in a manner that required focal lengths of the first optical portion and the second optical portion are provided for achieving a sharpest possible focus of the at least one object.

Optionally, the dynamically-controllable optical element is implemented as one of: a liquid crystal lens, a liquid lens.

Optionally, the optical element is rotationally asymmetric, the given imaging unit comprising at least one third actuator associated with the optical element, wherein the processor is configured to control the at least one third actuator to adjust a rotational orientation of the optical element according to the gaze direction of the user. Optionally, in such a case, the optical element is rotated (notably, about its center of rotation with respect to the camera. Optionally, the optical element is rotated to cover a circular area on the image sensor of the camera. In particular, the rotational orientation of the optical element is adjusted by the third actuator in a manner that the projection of the second region of the given real-world scene passes through or reflects from the second optical portion, whereas the projection of the first region of the given real-world scene passes through or reflects from the first optical portion. With a change in the gaze direction of the user, the first and second regions of the given real-world scene would also change, and therefore, the rotational orientation of the optical element would also be changed. The optical element is rotated to a given position, and the rotation is stopped when the optical element is aligned according to the detected gaze direction. In this way, the optical element is rotated repeatedly, based upon the detected gaze direction.

In some implementations, the optical element is asymmetrical about its optical axis. In such implementations, the optical element would always be rotationally asymmetric. In other implementations, the optical element is symmetrical about its optical axis. In such implementations, the optical element may or may not be rotationally asymmetric.

Optionally, when the optical element is asymmetrical about its optical axis,
  if the optical element is rotatable in only one direction, an angle of rotation of the optical element lies within a range of 0 degrees to 360 degrees; otherwise,
  if the optical element is rotatable in both the directions, the angle of rotation of the optical element lies within a range of 0 degrees to 180 degrees. One such example implementation has been illustrated in conjunction with FIG. 11.

Optionally, when the optical element is symmetrical about its optical axis and is rotationally asymmetric,
  if the optical element is rotatable in only one direction, the angle of rotation of the optical element lies within a range of 0 degrees to 180 degrees; otherwise,
  if the optical element is rotatable in both the directions, the angle of rotation of the optical element lies within a range of 0 degrees to 90 degrees. One such example implementation has been illustrated in conjunction with FIG. 10.

It will be appreciated that angle of rotation of the optical element is reduced considerably in a case where the optical element is symmetrical as compared to another case where the optical element is asymmetrical. As a result, the at least one third actuator is simpler to implement for a symmetrical optical element as compared to an asymmetrical optical element. Moreover, power consumption of the at least one third actuator also reduces in the case where the at least one optical element is symmetrical.

It will be appreciated that the optical center of the optical element may or may not be the same as a center of rotation. Moreover, it will be appreciated that the optical element is balanced in a manner that a center of mass of the optical element is at the center of rotation.

The present disclosure also relates to the method as described above. Various embodiments and variants disclosed above apply mutatis mutandis to the method.
  Optionally, the method further comprises:
    generating a depth or voxel map of the given real-world scene;
    determining, based on the depth or voxel map of the given real-world scene, an optical depth of at least one object present in the region of interest; and
    adjusting the optical focus of the given imaging unit, based also on the optical depth of at least one object, to capture the at least one warped image of the given real-world scene.
  Optionally, in the method, the at least one object comprises a first object and a second object, a first optical depth of the first object being different from a second optical depth of the second object, wherein the method further comprises:
    selecting a given optical depth that lies between the first optical depth and the second optical depth; and
    adjusting the optical focus of the given imaging unit, based on the given optical depth, to capture the at least one warped image of the given real-world scene.

Alternatively, optionally, in the method, the at least one object comprises a first object and a second object, a first optical depth of the first object being different from a second optical depth of the second object, the at least one imaging unit comprising a first imaging unit and a second imaging unit, wherein the method further comprises adjusting an optical focus of the first imaging unit and an optical focus of the second imaging unit, based on the first optical depth and the second optical depth, to capture a first warped image and a second warped image of the given real-world scene, respectively.

Optionally, in the method, the means for adjusting the optical focus of the given imaging unit comprises at least one first actuator associated with the optical element, wherein the step of adjusting the optical focus comprises moving, via the at least one first actuator, the optical element along an optical axis of the camera.

Optionally, in the method, the means for adjusting the optical focus of the given imaging unit comprises a focusing optical element and at least one second actuator associated therewith, wherein the step of adjusting the optical focus comprises moving, via the at least one second actuator, the focusing optical element along an optical axis of the camera.

Optionally, in the method, the optical element and the means for adjusting the optical focus of the given imaging unit are implemented together as a dynamically-controllable optical element, wherein the method further comprises dynamically changing the focal lengths of the first optical portion and the second optical portion of the optical element.

Optionally, in the method, the step of adjusting the optical focus of the given imaging unit comprises adjusting, based on the gaze direction of the user, at least one focusing parameter of the optical element.

Optionally, in the method, the first optical portion substantially surrounds the second optical portion, wherein the second focal length of the second optical portion is more than 1.25 times of the first focal length of the first optical portion.

Optionally, in the method, the optical element is rotationally asymmetric, the given imaging unit comprising at least one third actuator associated with the optical element, wherein the method further comprises controlling the at least one third actuator to adjust a rotational orientation of the optical element according to the gaze direction of the user.

DETAILED DESCRIPTION OF THE DRAWINGS

Referring to FIG. 1, illustrated is a block diagram of architecture of an imaging system 100 for producing images for a display apparatus 102, in accordance with an embodiment of the present disclosure. The imaging system 100 comprises at least one imaging unit (depicted as an imaging unit 104), and a processor 106 communicably coupled to the imaging unit 104. The imaging unit 104 comprises a camera 108, an optical element 110 that comprises at least a first optical portion 110A and a second optical portion 110B having different focal lengths, and means 112 for adjusting an optical focus of the imaging unit 104.

Figure 2:
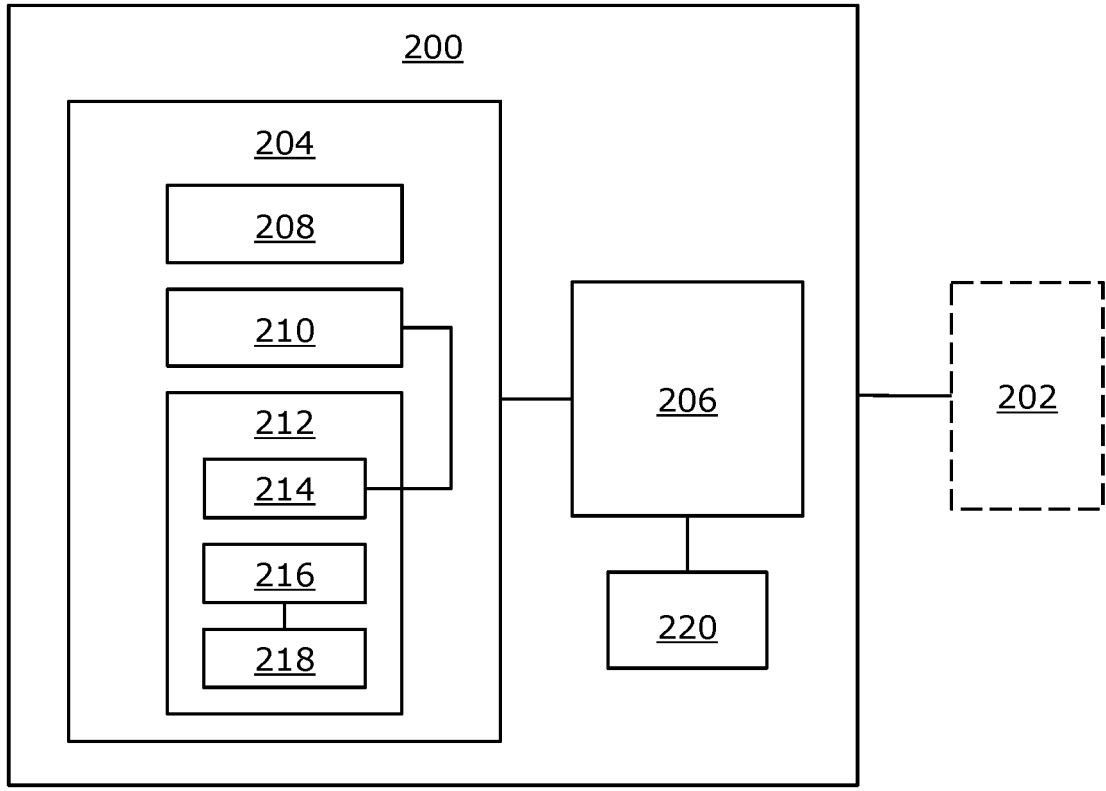

Referring to FIG. 2, illustrated is a block diagram of architecture of an imaging system 200 for producing images for a display apparatus 202, in accordance with another embodiment of the present disclosure. The imaging system 200 comprises at least one imaging unit (depicted as an imaging unit 204), and a processor 206 communicably coupled to the imaging unit 204. The imaging unit 204 comprises a camera 208, an optical element 210, and means 212 for adjusting an optical focus of the imaging unit 204.

As shown, the means 212 for adjusting the optical focus of the imaging unit 204 comprises at least one first actuator (depicted as a first actuator 214) that, in operation, moves the optical element 210 along an optical axis of the camera 208.

Moreover, the means 212 for adjusting the optical focus of the imaging unit 204 further comprises a focusing optical element 216 and at least one second actuator (depicted as a second actuator 218) that, in operation, moves the focusing optical element 216 along an optical axis of the camera 208.

The imaging system 200 further comprises means 220 for generating a depth or voxel map of a given real-world scene, wherein the processor 206 is coupled to the means 220.

Figure 3:
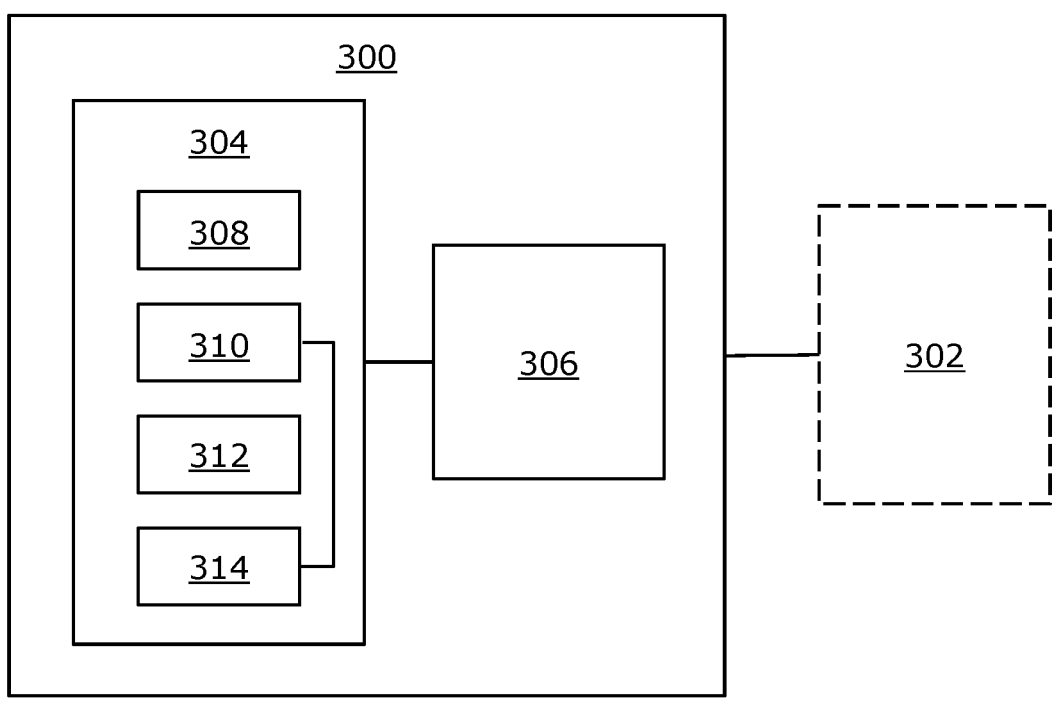

Referring to FIG. 3, illustrated is a block diagram of architecture of an imaging system 300 for producing images for a display apparatus 302, in accordance with yet another embodiment of the present disclosure. The imaging system 300 comprises at least one imaging unit (depicted as an imaging unit 304), and a processor 306 communicably coupled to the imaging unit 304.

The imaging unit 304 comprises a camera 308, an optical element 310 that comprises at least a first optical portion and a second optical portion having different focal lengths, and means 312 for adjusting an optical focus of the imaging unit 304. When the optical element 310 is rotationally asymmetric, the imaging unit 304 further comprises at least one third actuator (depicted as a third actuator 314) associated with the optical element 310, wherein the processor 306 is configured to control the third actuator 314 to adjust a rotational orientation of the optical element 310 according to the gaze direction of the user.

It may be understood by a person skilled in the art that FIG. 1, FIG. 2, and FIG. 3 depict simplified block diagrams of architectures of the imaging systems 100, 200, and 300, respectively, for sake of clarity, which should not unduly limit the scope of the claims herein. The person skilled in the art will recognize many variations, alternatives, and modifications of embodiments of the present disclosure.

Figure 4:
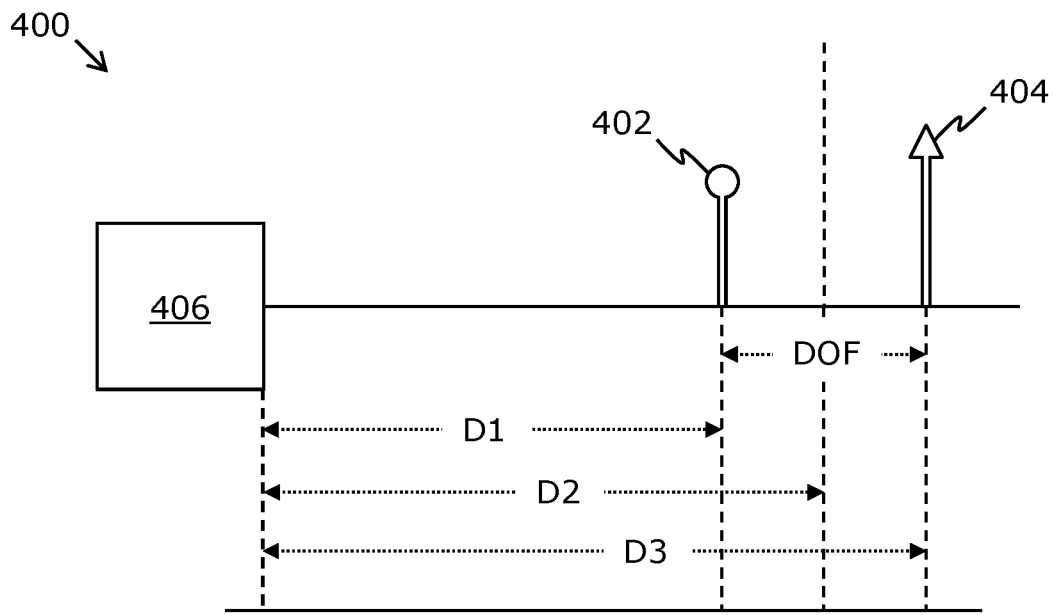
FIG. 4 illustrates an exemplary real-world scene including two objects at different optical depths, said two objects being captured using a single imaging unit, in accordance with an embodiment of the present disclosure.

Referring to FIG. 4, illustrated is an exemplary real-world scene 400 including two objects 402 and 404 at different optical depths, said two objects 402 and 404 being captured using a single imaging unit 406, in accordance with an embodiment of the present disclosure. In this regard, the object 402 can be considered as a first object, whereas the object 404 can be considered as a second object. As shown, a first optical depth D1 of the first object 402 is different from a second optical depth D3 of the second object 404. In the real-world scene 400, the first optical depth D1 is lesser than the second optical depth D3. In such a case, a processor (not shown) of an imaging system (not shown) is configured to select a given optical depth D2 that lies between the first optical depth D1 and the second optical depth D3, and adjust an optical focus of the imaging unit 406 of the imaging system, based on the given optical depth D2, to capture at least one warped image of the real-world scene 400.

It may be understood by a person skilled in the art that FIG. 4 depicts a simplified illustration of the exemplary real-world scene 400 and the imaging unit 406 for sake of clarity, which should not unduly limit the scope of the claims herein. The person skilled in the art will recognize many variations, alternatives, and modifications of embodiments of the present disclosure.

Figure 5:
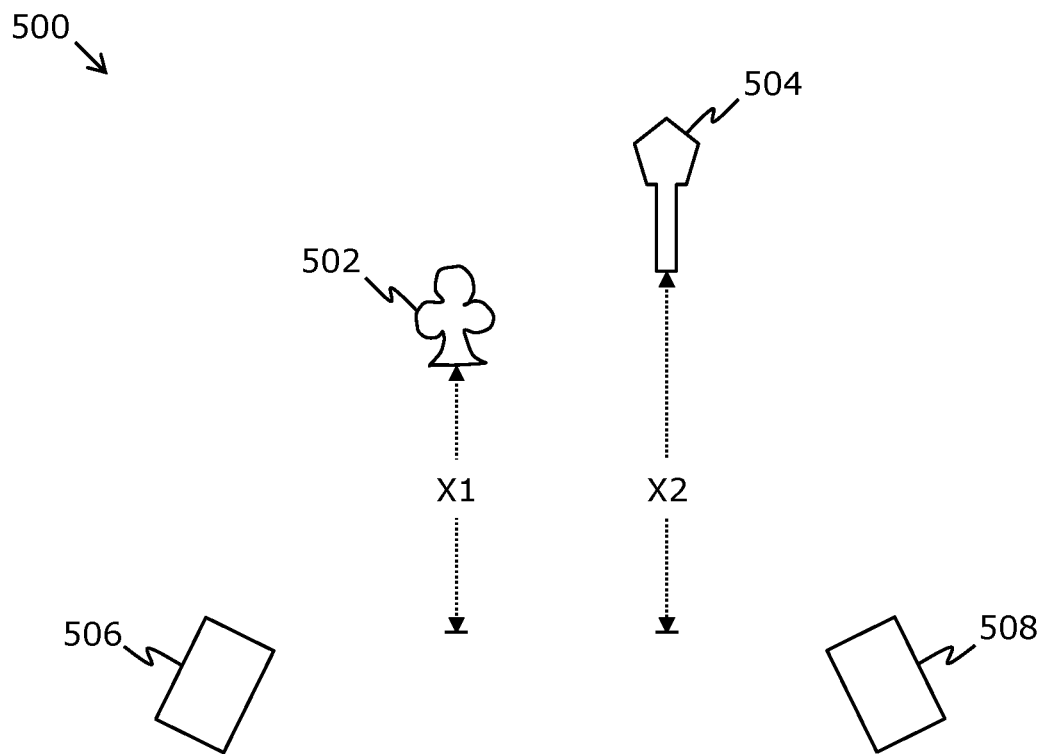
FIG. 5 illustrates an exemplary real-world scene including two objects at different optical depths, said two objects being captured using two imaging units, in accordance with an embodiment of the present disclosure.

Referring to FIG. 5, illustrated is an exemplary real-world scene 500 including two objects 502 and 504 at different optical depths, said two objects 502 and 504 being captured using two imaging units 506 and 508, in accordance with an embodiment of the present disclosure. In this regard, the object 502 can be considered as a first object, whereas the object 504 can be considered as a second object. As shown, a first optical depth X1 of the first object 502 is different from a second optical depth X2 of the second object 504. In the real-world scene 500, the first optical depth X1 is lesser than the second optical depth X2. Moreover, the imaging unit 506 can be considered as a first imaging unit, whereas the imaging 508 can be considered as a second imaging unit. In such a case, a processor of an imaging system is configured to adjust an optical focus of the first imaging unit 506 and an optical focus of the second imaging unit 508, based on the first optical depth X1 and the second optical depth X2, to capture a first warped image and a second warped image of the real-world scene 500, respectively. Notably, the first imaging unit 506 is focused at the first optical depth X1, whereas the second imaging unit 508 is focused at the second optical depth X2.

It may be understood by a person skilled in the art that FIG. 5 depicts a simplified illustration of the exemplary real-world scene 500 and the imaging units 506 and 508 for sake of clarity, which should not unduly limit the scope of the claims herein. The person skilled in the art will recognize many variations, alternatives, and modifications of embodiments of the present disclosure.

Figure 6:
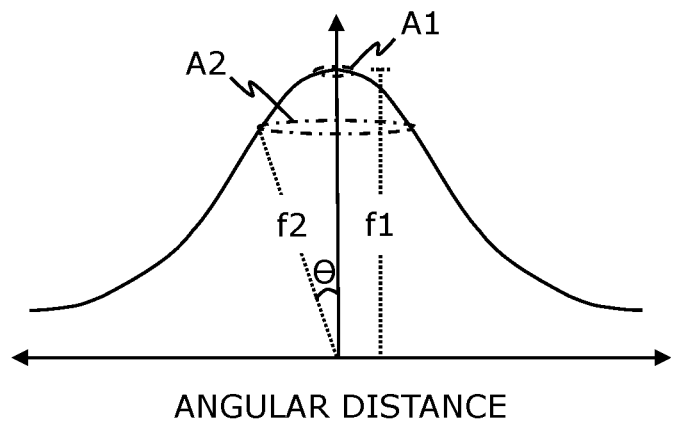
FIG. 6 is an example graphical representation of depth of field of a given imaging unit as a function of focal length of an optical element of the given imaging unit, in accordance with an embodiment of the present disclosure.

Referring to FIG. 6, illustrated is an example graphical representation of depth of field of a given imaging unit as a function of focal length of an optical element of the given imaging unit, in accordance with an embodiment of the present disclosure. With reference to FIG. 6, the optical element has variable optical properties across its field of view. As shown, the focal length of the optical element is maximum along an axis passing through the center of the second optical portion, and decreases on going away from said center. As an example, the focal length of the optical element along the axis passing through the center of the second optical portion is f1, whereas the focal length of the optical element at an angular distance of 30 degrees (depicted as θ) from said axis is f2, wherein f2 is lesser than f1.

As a result, the depth of field of the given imaging unit varies inversely with respect to the focal length of the optical element of the given imaging unit. When the focal length of the optical element is f1 (for example, equal to 7 millimeters), a narrow depth of field A1 is provided by the given imaging unit. When the focal length of the optical element is f2 (for example, equal to 5 millimeters), a wide depth of field A2 is provided by the given imaging unit.

It may be understood by a person skilled in the art that FIG. 6 depicts an exemplary graphical representation for sake of clarity, which should not unduly limit the scope of the claims herein. The person skilled in the art will recognize many variations, alternatives, and modifications of embodiments of the present disclosure.

Figure 7:
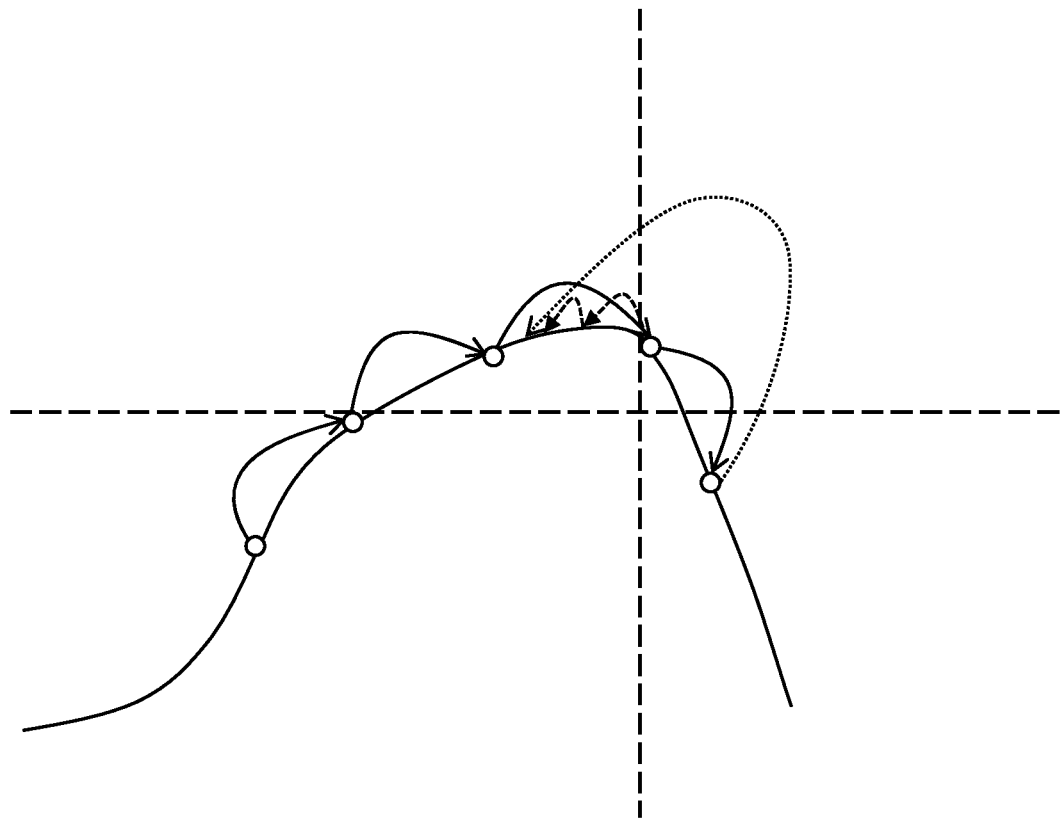
FIG. 7 is an example graphical representation of how focus is adjusted via an imaging system, in accordance with an embodiment of the present disclosure.

Referring to FIG. 7, illustrated is an example graphical representation of how focus is adjusted via an imaging system, in accordance with an embodiment of the present disclosure. As shown, the optical focus of a given imaging unit of the imaging system is adjusted in a step-wise manner, according to a Hill-climbing focusing algorithm. According to the step-wise manner, the optical focus of the given imaging unit is adjusted as a combination of coarse steps (depicted as solid steps) and fine steps (depicted as dashed steps) until a required optical focus is obtained. Notably, step size of the coarse steps and the fine steps is calculated by the processor of the imaging system, based on optical parameters of the imaging system and the gaze direction of the user. As shown, the step size of the coarse steps is greater than the step size of the fine steps. Moreover, when a contrast of a currently captured image is lower than a contrast of a previously captured image during repetitive coarse stepping, a resolution peak of the Hill-climbing focusing algorithm is understood to be missed. In such a case, repetitive fine stepping is employed to reach the resolution peak of the Hill-climbing focusing algorithm. A return step (depicted as a dotted step) indicates a step difference between an end point of the repetitive coarse stepping and an end point of the repetitive fine stepping. In the example graphical representation, the return step has a larger step size as compared to the coarse steps.

It may be understood by a person skilled in the art that FIG. 7 depicts an exemplary graphical representation for sake of clarity, which should not unduly limit the scope of the claims herein. The person skilled in the art will recognize many variations, alternatives, and modifications of embodiments of the present disclosure.

Figure 8:
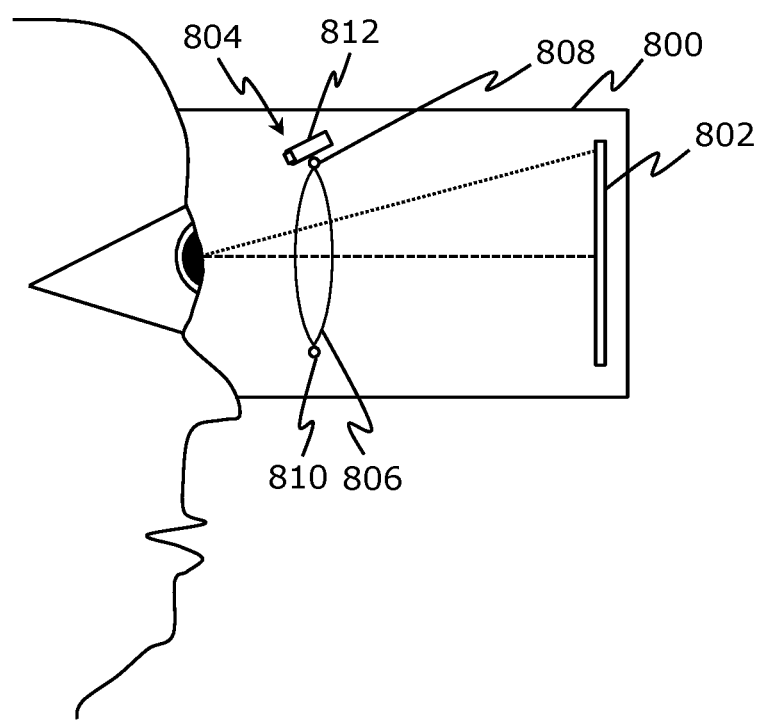
FIG. 8 is an example implementation of a display apparatus, in accordance with an embodiment of the present disclosure.

Referring to FIG. 8, illustrated is an example implementation of a display apparatus 800, in accordance with an embodiment of the present disclosure. The display apparatus 800, in operation, is worn by a user on his/her head. The display apparatus 800 comprises at least one image renderer (depicted as an image renderer 802), a means 804 for detecting gaze direction, an exit optical element 806, and a processing module (not shown). The image renderer 802, in operation, renders an image. In this example implementation, the image is optionally a de-warped image. A projection of the de-warped image passes through the exit optical element 806, to be incident upon the user's eye. The means 804 for detecting gaze direction is implemented using a set of illuminators (depicted as illuminators 808 and 810) for emitting light to illuminate the user's eye, a gaze-tracking camera 812 for capturing an image of reflections of the light from the user's eye, and a processing unit (not shown) coupled in communication with the set of illuminators 808 and 810 and the gaze-tracking camera 812, wherein the processing unit is configured to detect the gaze direction of the user using the captured image.

Figure 9:
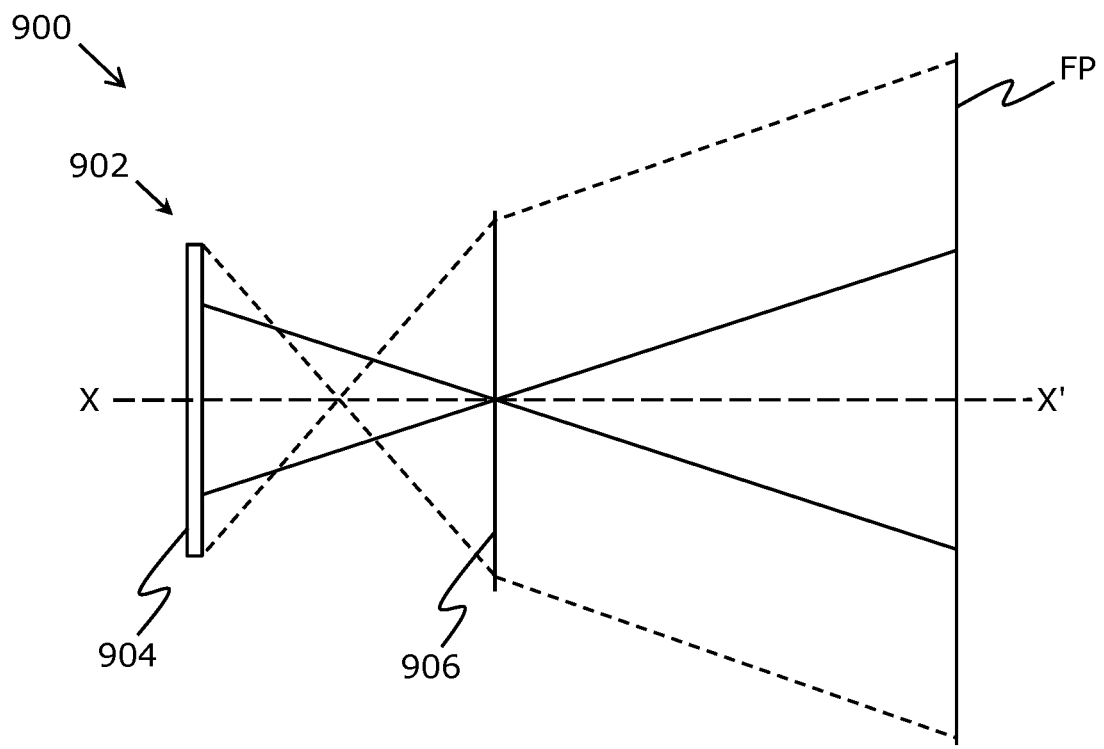
FIG. 9 is an example implementation of a given imaging unit, in accordance with an embodiment of the present disclosure.

Referring to FIG. 9, illustrated is an example implementation of an imaging unit 900, in accordance with an embodiment of the present disclosure. The imaging unit 900 comprises a camera 902, an optical element (not shown), and a means (not shown) for adjusting an optical focus of the imaging unit. An optical axis of the imaging unit 900 is represented as a long-dashed line X-X'. The camera 902 comprises at least an image sensor 904. The optical element comprises at least a first optical portion and a second optical portion having different focal lengths. A projection of a given real-world scene is differently magnified by the first optical portion and the second optical portion. As shown, a first region of the projection of a given real-world scene (depicted as solid lines) is magnified by the first optical portion, whereas a second region of the projection of the given real-world scene (depicted as small-dashed lines) is de-magnified by the second optical portion.

Moreover, in the imaging unit 900, the optical element and the means for adjusting the optical focus of the given imaging unit are implemented together as a dynamically-controllable optical element 906, the focal lengths of the first optical portion and the second optical portion of the optical element being dynamically changeable. A processor of an imaging system is configured to control the dynamically-controllable optical element 906 to adjust an optical focus of the imaging unit 900 at a given focal plane FP within the given real-world scene.

FIG. 9 is merely an example, which should not unduly limit the scope of the claims herein. A person skilled in the art will recognize many variations, alternatives, and modifications of embodiments of the present disclosure. For example, some regions of the projection of the given real-world scene may be neither magnified nor de-magnified.

Figure 10:
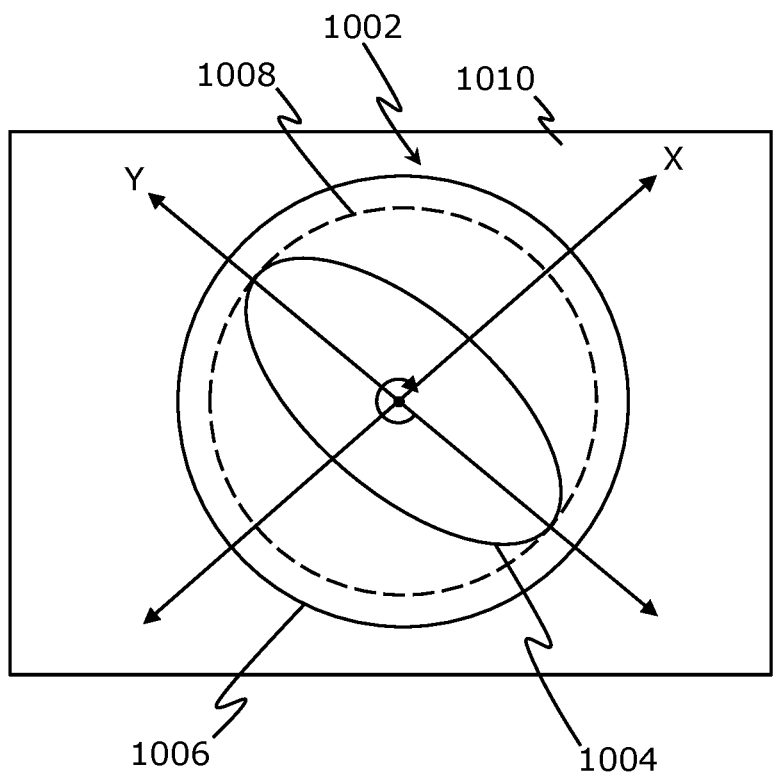
FIG. 10 is a schematic illustration of an example implementation where a symmetrical optical element is rotated with respect to a camera, in accordance with an embodiment of the present disclosure.

Referring to FIG. 10, illustrated is a schematic illustration of an example implementation where a symmetrical optical element 1002 is rotated with respect to a camera, in accordance with an embodiment of the present disclosure. In this example implementation, the optical element 1002 is symmetrical about its optical axis and a second optical portion 1004 is substantially ellipsoidal in shape. A first optical portion 1006 substantially surrounds the second optical portion 1004, wherein a first focal length of the first optical portion 1006 is smaller than a second focal length of the second optical portion 1004.

In FIG. 10, there is shown a centre (depicted by a black dot) of the second optical portion 1004, which is also a centre of rotation. Two lines representing X and Y directions pass through the centre of rotation, which overlaps with the centre of a warped image. The optical element 1002 is rotated (namely, about the centre of rotation) to cover a circular area 1008 on an image sensor 1010 of the camera using the second optical portion 1004.

The optical element 1002 is rotated to a given position, and the rotation is stopped when the second optical portion 1004 is aligned according to the detected gaze direction. In this way, the optical element 1002 is rotated repeatedly, based upon the detected gaze direction. A symmetrical optical element such as the optical element 1002 may or may not be rotationally asymmetric.

When moving from a first position to a second position (namely, with respect to a change in the user's gaze direction), the optical element 1002 is required to be rotated at an angle that lies in:
  a range of 0 degrees to 180 degrees, when the optical element 1002 rotates in only one direction, or
  a range of 0 degrees to 90 degrees, when the optical element 1002 rotates in both directions.

Figure 11:
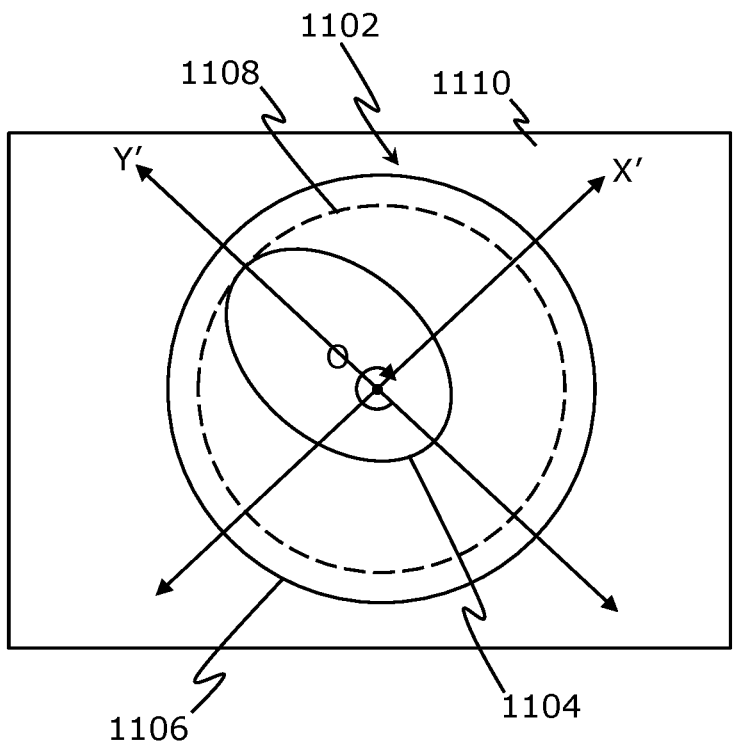
FIG. 11 is a schematic illustration of another example implementation where an asymmetrical optical element is rotated with respect to a camera, in accordance with another embodiment of the present disclosure.

Referring to FIG. 11, illustrated is a schematic illustration of another example implementation where an asymmetrical optical element 1102 is rotated with respect to a camera, in accordance with another embodiment of the present disclosure. In this example implementation, the optical element 1102 is asymmetrical about its optical axis and a second optical portion 1104 is substantially ellipsoidal in shape. A first optical portion 1106 substantially surrounds the second optical portion 1104, wherein a first focal length of the first optical portion 1106 is smaller than a second focal length of the second optical portion 1104.

In FIG. 11, there are shown a centre 'O' of the second optical portion 1104 and a centre of rotation (depicted by a black dot). Two lines representing X' and Y' directions pass through the centre of rotation, which overlaps with the centre of a warped image. As the optical centre 'O' of the second optical portion 1104 is not the same as the centre of rotation, the optical element 1102 is rotated (namely, about the centre of rotation) to cover a circular area 1108 on an image sensor 1110 of the camera using the second optical portion 1104.

The optical element 1102 is rotated to a given position, and the rotation is stopped when the second optical portion 1104 is aligned according to the detected gaze direction. In this way, the optical element 1102 is rotated repeatedly, based upon the detected gaze direction. An asymmetrical optical element such as the optical element 1102 is rotationally asymmetric.

When moving from a first position to a second position (namely, with respect to a change in the user's gaze direction), the optical element 1102 is required to be rotated at an angle that lies in:

- a range of 0 degrees to 360 degrees, when the optical element 1102 rotates in only one direction, or
- a range of 0 degrees to 180 degrees, when the optical element 1102 rotates in both directions.

FIGS. 10 and 11 are merely examples, which should not unduly limit the scope of the claims herein. A person skilled in the art will recognize many variations, alternatives, and modifications of embodiments of the present disclosure. It will be appreciated that the optical elements 1002 and 1102 have been depicted as lenses, for the sake of convenience only; the optical elements 1002 and 1102 are not limited to a particular type of optical element. In other words, the optical elements 1002 and 1102 can be implemented as a single lens or mirror having a complex shape or as a configuration of lenses and/or mirrors.

Figure 12:
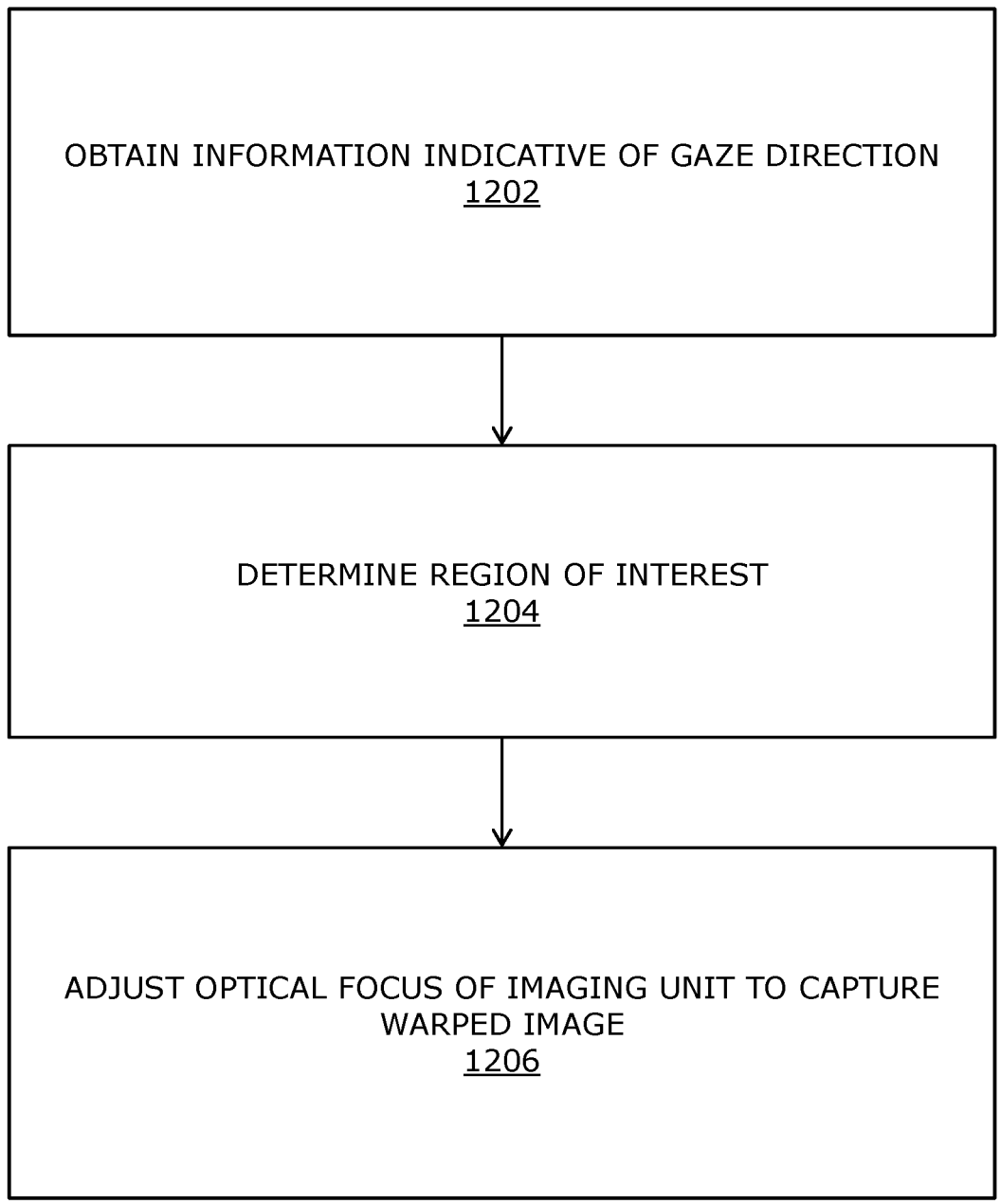
FIG. 12 illustrates steps of a method for producing images for a display apparatus, in accordance with an embodiment of the present disclosure.

Referring to FIG. 12, illustrated are steps of a method for producing images for a display apparatus, in accordance with an embodiment of the present disclosure. The method is implemented via an imaging system comprising at least one imaging unit arranged to face a given real-world scene, a given imaging unit comprising a camera, an optical element that comprises at least a first optical portion and a second optical portion having different focal lengths, wherein a first focal length of the first optical portion is smaller than a second focal length of the second optical portion, and means for adjusting an optical focus of the given imaging unit. At a step 1202, information indicative of a gaze direction of a user is obtained from the display apparatus. At a step 1204, a region of interest within the given real-world scene is determined based on the gaze direction of the user. At a step, 1206, an optical focus of the given imaging unit is adjusted based on the focal lengths of the first optical portion and the second optical portion, to capture at least one warped image of the given real-world scene. The at least one warped image having a spatially-uniform angular resolution.

The steps 1202, 1204 and 1206 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system for producing images for a display apparatus, the imaging system comprising:
   at least one imaging unit arranged to face a given real-world scene, a given imaging unit comprising:
   a camera;
   an optical element that comprises at least a first optical portion and a second optical portion having different focal lengths, wherein a first focal length of the first optical portion is smaller than a second focal length of the second optical portion; and
   means for adjusting an optical focus of the given imaging unit; and
   a processor communicably coupled to the at least one imaging unit, wherein the processor is configured to:
   obtain, from the display apparatus, information indicative of a gaze direction of a user;
   determine, based on the gaze direction of the user, a region of interest within the given real-world scene; and
   control the means for adjusting the optical focus of the given imaging unit, based on the focal lengths of the first optical portion and the second optical portion, to capture at least one warped image of the given real-world scene, the at least one warped image having a spatially-uniform angular resolution,
   wherein the imaging system further comprises means for generating a depth or voxel map of the given real-world scene, wherein the processor is configured to:
   determine, based on the depth or voxel map of the given real-world scene, an optical depth of at least one object present in the region of interest; and
   control the means for adjusting the optical focus of the given imaging unit, based also on the optical depth of at least one object, to capture the at least one warped image of the given real-world scene,
   and wherein the at least one object comprises a first object and a second object, a first optical depth of the first object being different from a second optical depth of the second object, wherein the processor is configured to:
   select a given optical depth that lies between the first optical depth and the second optical depth; and
   adjust the optical focus of the given imaging unit, based on the given optical depth, to capture the at least one warped image of the given real-world scene.

2. The imaging system of claim 1, wherein the at least one object comprises a first object and a second object, a first optical depth of the first object being different from a second optical depth of the second object, the at least one imaging unit comprising a first imaging unit and a second imaging unit, wherein the processor is configured to adjust an optical focus of the first imaging unit and an optical focus of the second imaging unit, based on the first optical depth and the second optical depth, to capture a first warped image and a second warped image of the given real-world scene, respectively.

3. The imaging system of claim 1, wherein the means for adjusting the optical focus of the given imaging unit comprises at least one first actuator that, in operation, moves the optical element along an optical axis of the camera.

4. The imaging system of claim 1, wherein the means for adjusting the optical focus of the given imaging unit comprises a focusing optical element and at least one second actuator that, in operation, moves the focusing optical element along an optical axis of the camera.

5. The imaging system of claim 1, wherein the optical element and the means for adjusting the optical focus of the given imaging unit are implemented together as a dynamically-controllable optical element, the focal lengths of the first optical portion and the second optical portion of the optical element being dynamically changeable.

6. The imaging system of claim 1, wherein when controlling the means for adjusting the optical focus of the given imaging unit, the processor is configured to adjust, based on the gaze direction of the user, at least one focusing parameter of the optical element.

7. The imaging system of claim 1, wherein the first optical portion substantially surrounds the second optical portion, wherein the second focal length of the second optical portion is more than 1.25 times of the first focal length of the first optical portion.

8. The imaging system of claim 1, wherein the optical element is rotationally asymmetric, the given imaging unit comprising at least one third actuator associated with the optical element, wherein the processor is configured to control the at least one third actuator to adjust a rotational orientation of the optical element according to the gaze direction of the user.

9. A method for producing images for a display apparatus, the method being implemented via an imaging system comprising at least one imaging unit arranged to face a given real-world scene, a given imaging unit comprising a camera, an optical element that comprises at least a first optical portion and a second optical portion having different focal lengths, wherein a first focal length of the first optical portion is smaller than a second focal length of the second optical portion, and means for adjusting an optical focus of the given imaging unit, the method comprising:
  obtaining, from the display apparatus, information indicative of a gaze direction of a user;
  determining, based on the gaze direction of the user, a region of interest within the given real-world scene; and
  adjusting an optical focus of the given imaging unit, based on the focal lengths of the first optical portion and the second optical portion, to capture at least one warped image of the given real-world scene, the at least one warped image having a spatially-uniform angular resolution;
  the method further comprising:
    generating a depth or voxel map of the given real-world scene;
    determining, based on the depth or voxel map of the given real-world scene, an optical depth of at least one object present in the region of interest; and
    adjusting the optical focus of the given imaging unit, based also on the optical depth of at least one object, to capture the at least one warped image of the given real-world scene,
  wherein the at least one object comprises a first object and a second object, a first optical depth of the first object being different from a second optical depth of the second object, wherein the method further comprises:
    selecting a given optical depth that lies between the first optical depth and the second optical depth; and
    adjusting the optical focus of the given imaging unit, based on the given optical depth, to capture the at least one warped image of the given real-world scene.

10. The method of claim 9, wherein the at least one object comprises a first object and a second object, a first optical depth of the first object being different from a second optical depth of the second object, the at least one imaging unit comprising a first imaging unit and a second imaging unit, wherein the method further comprises adjusting an optical focus of the first imaging unit and an optical focus of the second imaging unit, based on the first optical depth and the second optical depth, to capture a first warped image and a second warped image of the given real-world scene, respectively.

11. The method of claim 9, wherein the means for adjusting the optical focus of the given imaging unit comprises at least one first actuator associated with the optical element, wherein the step of adjusting the optical focus comprises moving, via the at least one first actuator, the optical element along an optical axis of the camera.

12. The method of claim 9, wherein the means for adjusting the optical focus of the given imaging unit comprises a focusing optical element and at least one second actuator associated therewith, wherein the step of adjusting the optical focus comprises moving, via the at least one second actuator, the focusing optical element along an optical axis of the camera.

13. The method of claim 9, wherein the optical element and the means for adjusting the optical focus of the given imaging unit are implemented together as a dynamically-controllable optical element, wherein the method further comprises dynamically changing the focal lengths of the first optical portion and the second optical portion of the optical element.

14. The method of claim 9, wherein the step of adjusting the optical focus of the given imaging unit comprises adjusting, based on the gaze direction of the user, at least one focusing parameter of the optical element.

15. The method of claim 9, wherein the first optical portion substantially surrounds the second optical portion, wherein the second focal length of the second optical portion is more than 1.25 times of the first focal length of the first optical portion.

16. The method of claim 9, wherein the optical element is rotationally asymmetric, the given imaging unit comprising at least one third actuator associated with the optical element, wherein the method further comprises controlling the at least one third actuator to adjust a rotational orientation of the optical element according to the gaze direction of the user.

* * * * *